US012027112B2

(12) United States Patent
Zhou et al.

(10) Patent No.: US 12,027,112 B2
(45) Date of Patent: Jul. 2, 2024

(54) ALWAYS ON DISPLAY METHOD AND MOBILE DEVICE

(71) Applicant: Huawei Technologies Co., Ltd., Shenzhen (CN)

(72) Inventors: Jian Zhou, Shenzhen (CN); Xiao Xiao, Shenzhen (CN); Kai Hu, Xi'an (CN); Jianbin Li, Shenzhen (CN); Shuliang Ma, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/768,963

(22) PCT Filed: Jul. 17, 2020

(86) PCT No.: PCT/CN2020/102523
§ 371 (c)(1),
(2) Date: Apr. 14, 2022

(87) PCT Pub. No.: WO2021/073183
PCT Pub. Date: Apr. 22, 2021

(65) Prior Publication Data
US 2024/0105114 A1 Mar. 28, 2024

(30) Foreign Application Priority Data

Oct. 18, 2019 (CN) .............................. 201910995673

(51) Int. Cl.
*G09G 3/3208* (2016.01)
(52) U.S. Cl.
CPC ....... *G09G 3/3208* (2013.01); *G09G 2320/08* (2013.01); *G09G 2330/021* (2013.01); *G09G 2354/00* (2013.01)

(58) Field of Classification Search
None
See application file for complete search history.

(56) References Cited

U.S. PATENT DOCUMENTS

| 2013/0154990 A1 | 6/2013 | Hamada |
| 2017/0025055 A1 | 1/2017 | Kim et al. |
| 2017/0185135 A1 | 6/2017 | Imamura |

(Continued)

FOREIGN PATENT DOCUMENTS

| CN | 103135977 A | 6/2013 |
| CN | 104090755 A | 10/2014 |

(Continued)

*Primary Examiner* — Nicholas J Lee
(74) *Attorney, Agent, or Firm* — Conley Rose, P.C.

(57) ABSTRACT

A method includes running, in an always-on display state of the mobile device, a first algorithm program to display a first clock interface in a first display area of a display of the mobile device, receiving a switching instruction when the mobile device is switched from a first clock style to a second clock style, wherein the second clock interface is different from the first clock interface, performing switching from the first algorithm program to a second algorithm program in response to the switching instruction, and running, in the always-on display state, the second algorithm program to display the second clock interface in a second display area of the display, wherein a size of the second display area is different from a size of the first display area, and wherein the second algorithm program is different from the first algorithm program.

20 Claims, 22 Drawing Sheets

(56) References Cited

U.S. PATENT DOCUMENTS

2018/0176746 A1 6/2018 Kapatralla et al.
2019/0369695 A1 12/2019 Wang et al.

FOREIGN PATENT DOCUMENTS

| CN | 104834470 A | 8/2015 |
| CN | 104850379 A | 8/2015 |
| CN | 105224277 A | 1/2016 |
| CN | 106373515 A | 2/2017 |
| CN | 106919354 A | 7/2017 |
| CN | 107621918 A | 1/2018 |
| CN | 109343759 A | 2/2019 |
| CN | 110554815 A | 12/2019 |
| WO | 2017166590 A1 | 10/2017 |

800

┌─────────────────────────────────────────────────────┐
│ A mobile device runs a first algorithm program in an always on │
│ display state, to display a first clock interface, where the first clock │ ── 810
│ interface is displayed in a first display area of a display of the │
│ mobile device │
└─────────────────────────────────────────────────────┘
                              │
┌─────────────────────────────────────────────────────┐
│ The mobile device receives a switching instruction, where the │ ── 820
│ switching instruction is an instruction generated when the mobile │
│ device is switched from a first clock style to a second clock style │
└─────────────────────────────────────────────────────┘
                              │
┌─────────────────────────────────────────────────────┐
│ The mobile device performs switching from the first algorithm │ ── 830
│ program to a second algorithm program in response to the │
│ switching instruction │
└─────────────────────────────────────────────────────┘
                              │
┌─────────────────────────────────────────────────────┐
│ The mobile device runs the second algorithm program in the always │
│ on display state, to display a second clock interface, where the │ ── 840
│ second clock interface is displayed in a second display area of the │
│ display of the mobile device │
└─────────────────────────────────────────────────────┘

FIG. 8

ALWAYS ON DISPLAY METHOD AND MOBILE DEVICE

CROSS-REFERENCE TO RELATED APPLICATIONS

This is a U.S. National Stage of International Patent Application No. PCT/CN2020/102523 filed on Jul. 17, 2020, which claims priority to Chinese Patent Application No. 201910995673.8 filed on Oct. 18, 2019. Both of the aforementioned applications are hereby incorporated by reference in their entireties.

TECHNICAL FIELD

This application relates to the field of electronic technologies, and in particular, to an always on display method and a mobile device.

BACKGROUND

With rapid development and improvement of functions of a mobile device, increasing applications are installed on the mobile device of a user, and the user increasingly frequently uses the mobile device. To reduce power consumption of the mobile device, the mobile device displays information such as time, a date, and a battery level by using always on display (always on display, AOD).

The AOD is a feature in which specific content is displayed in some areas of a screen without lighting up the entire screen, and the user may view information such as time, a date, and a battery level when the mobile device is in a sleep state. In this way, information is conveniently and quickly viewed without waking up the screen.

Currently, organic light-emitting diode (organic light emitting devices, OLED) displays are used for an AOD function. The OLED displays include a video mode (video mode) and a command mode (command mode). A random access memory (random access memory, RAM) is disposed in an OLED display in the command mode, and the RAM in the OLED display may buffer a refresh interface sent by a mobile device side to the OLED display. The OLED display in the command mode may perform display refresh by using the refresh interface stored in the RAM in the display. No RAM is disposed in an OLED display in the video mode, and therefore the AOD function is implemented by using a line buffer (line buffer) in an integrated circuit (integrated circuit, IC) module. The line buffer may store some pictures. However, full-screen display cannot be implemented, and display can be implemented only in some areas.

Therefore, the OLED display, in the video mode, that includes no RAM can perform refresh only by using a 1-bit algorithm or a 2-bit algorithm. However, a default refresh algorithm is applicable only to one scenario, for example, a single clock interface or a dual clock interface. When the user changes an AOD display mode through manual setting, a single algorithm cannot adapt to a plurality of scenarios, and there is a relatively poor display effect.

SUMMARY

This application provides an always on display method and a mobile device, so that adaptation to a single clock style and a multi-clock style of an AOD function of the mobile device can be implemented, and different algorithm programs can be adaptively used, to ensure an optimal display effect, and improve user experience.

According to a first aspect, an always on display AOD method is provided, and is applied to a mobile device. The method includes: The mobile device runs a first algorithm program in an always on display state, to display a first clock interface, where the first clock interface is displayed in a first display area of a display of the mobile device; the mobile device receives a switching instruction, where the switching instruction is an instruction generated when the mobile device is switched from a first clock style to a second clock style, the first clock style corresponds to the first clock interface, the second clock style corresponds to a second clock interface, and the second clock style is different from the first clock style; the mobile device performs switching from the first algorithm program to a second algorithm program in response to the switching instruction; and the mobile device runs the second algorithm program in the always on display state, to display the second clock interface, where the second clock interface is displayed in a second display area of the display of the mobile device, the second clock interface is different from the first clock interface, a size of the second display area is different from a size of the first display area, and the first algorithm program is different from the second algorithm program.

In the method, automatic adaptation to a single clock style and a multi-clock style of an AOD function of the mobile device is implemented, and different algorithm programs are adaptively used for display, to ensure an optimal display effect.

For example, in the method, for the single clock style set by a user, a display area and a display policy may be determined by using a 2-bit algorithm program, so that there is a relatively small display area. To adapt to the relatively small display area, information such as time, a location, and a date in a single clock window is presented in an effect of being displayed in a relatively small font size. In this way, there is no burr phenomenon on an edge, and the display effect is improved. For the multi-clock style (for example, a dual clock style) set by the user, a display area and a display policy may be determined by using a 1-bit algorithm program. In this way, the display area is expanded, and therefore adaptation to display of a plurality of clock windows can be implemented, to ensure that information such as time, a location, and a date in all the clock windows can be presented in the display area.

With reference to the first aspect, in some implementations of the first aspect, the first clock style is a single clock style, and the second clock style is a multi-clock style; or the first clock style is a multi-clock style, and the second clock style is a single clock style.

With reference to the first aspect and the foregoing implementations, in some implementations of the first aspect, the single clock style is used to display one clock window on the mobile device, and the clock window can move in a corresponding display area of the display; and the multi-clock style is used to display at least two clock windows on the mobile device, the at least two clock windows can move in a corresponding display area of the display, and the corresponding display area of the display is smaller than an entire display area of the display.

In the method, a clock window (a single clock window or a plurality of clock windows) may move in a corresponding display area of the display. Therefore, there is no case in which a same static picture is always displayed in a specific part, and a problem of screen burn-in is avoided, thereby prolonging a service life of a screen.

With reference to the first aspect and the foregoing implementations, in some implementations of the first aspect, when the first clock style is a single clock style, and the second clock style is a multi-clock style, the first algorithm program is a 2-bit algorithm program, and the second algorithm program is a 1-bit algorithm program; or when the first clock style is a multi-clock style, and the second clock style is a single clock style, the first algorithm program is a 1-bit algorithm program, and the second algorithm program is a 2-bit algorithm program.

With reference to the first aspect and the foregoing implementations, in some implementations of the first aspect, the display includes an organic light-emitting diode OLED display, the OLED display includes no random access memory, and the switching instruction is used to indicate to perform switching from the first algorithm program to the second algorithm program.

With reference to the first aspect and the foregoing implementations, in some implementations of the first aspect, that the mobile device runs a first algorithm program in an always on display state, to display a first clock interface, where the first clock interface is displayed in a first display area of a display of the mobile device; the mobile device receives a switching instruction, where the switching instruction is an instruction generated when the mobile device is switched from a first clock style to a second clock style, the first clock style corresponds to the first clock interface, the second clock style corresponds to a second clock interface, and the second clock style is different from the first clock style; the mobile device performs switching from the first algorithm program to a second algorithm program in response to the switching instruction; and the mobile device runs the second algorithm program in the always on display state, to display the second clock interface, where the second clock interface is displayed in a second display area of the display of the mobile device, the second clock interface is different from the first clock interface, a size of the second display area is different from a size of the first display area, and the second algorithm program is different from the first algorithm program includes: The mobile device runs the first algorithm program in the always on display state, to display the first clock interface, where the first clock interface is displayed in the first display area of the display of the mobile device; the mobile device detects a first operation, where the first operation is used for unlocking; the mobile device displays, in response to the first operation, an interface that exists after unlocking; the mobile device detects a second operation that acts on a settings icon, and displays a settings interface; the mobile device detects, on an AOD settings interface, a third operation of performing switching from the first clock style to the second clock style, where the first clock style corresponds to the first clock interface, the second clock style corresponds to the second clock interface, and the second clock style is different from the first clock style; the mobile device generates the switching instruction in response to the third operation; the mobile device performs switching from the first algorithm program to the second algorithm program in response to the switching instruction; and after entering the always on display state, the mobile device runs the second algorithm program in the always on display state, to display the second clock interface, where the second clock interface is displayed in the second display area of the display of the mobile device, the second clock interface is different from the first clock interface, the size of the second display area is different from the size of the first display area, and the second algorithm program is different from the first algorithm program.

In the method, the user may perform a corresponding switching operation in a settings application, so that the mobile device may be switched from the single clock style to the dual clock style or from the dual clock style to the single clock style.

With reference to the first aspect and the foregoing implementations, in some implementations of the first aspect, that the mobile device runs a first algorithm program in an always on display state, to display a first clock interface, where the first clock interface is displayed in a first display area of a display of the mobile device; the mobile device receives a switching instruction, where the switching instruction is an instruction generated when the mobile device is switched from a first clock style to a second clock style, the first clock style corresponds to the first clock interface, the second clock style corresponds to a second clock interface, and the second clock style is different from the first clock style; the mobile device performs switching from the first algorithm program to a second algorithm program in response to the switching instruction; and the mobile device runs the second algorithm program in the always on display state, to display the second clock interface, where the second clock interface is displayed in a second display area of the display of the mobile device, the second clock interface is different from the first clock interface, a size of the second display area is different from a size of the first display area, and the second algorithm program is different from the first algorithm program includes: The mobile device runs the first algorithm program in the always on display state, to display the first clock interface, where the first clock interface is displayed in the first display area of the display of the mobile device; the mobile device receives the switching instruction in the always on display state, where the switching instruction is an instruction generated when the mobile device is switched from the first clock style to the second clock style, the first clock style corresponds to the first clock interface, the second clock style corresponds to the second clock interface, and the second clock style is different from the first clock style; the mobile device performs switching from the first algorithm program to the second algorithm program in response to the switching instruction; and the mobile device runs the second algorithm program in the always on display state, to display the second clock interface, where the second clock interface is displayed in the second display area of the display of the mobile device, the second clock interface is different from the first clock interface, the size of the second display area is different from the size of the first display area, the second algorithm program is different from the first algorithm program, and the second clock style is different from the first clock style.

In the method, the mobile device may alternatively receive the switching instruction from the user in the always on display state. For example, in a screen-off scenario, the mobile device may detect a gesture (for example, a mid-air gesture or another shortcut gesture) performed by the user, and perform a switching operation by using the detected gesture performed by the user. A method for switching a clock style by the user is not limited in this application.

In the foregoing technical solution, when the mobile device displays a plurality of clock windows, AOD display is performed by using the 1-bit algorithm program, so that a display area is larger than a display area determined by using the 2-bit algorithm program. In this way, the display area is expanded, and therefore adaptation to display of the plurality of clock windows can be implemented, to ensure that information such as time, a location, and a date in all the clock windows can be presented in the display area. In addition, during multi-clock display, information such as time, a location, and a date in the clock window is displayed in a relatively small font size. Therefore, there is no sensitive burr on a font edge, and a good effect is presented without affecting a visual effect of the user. In addition, the clock window may move in the relatively large display area. Therefore, there is no case in which a same static picture is always displayed in a specific part, and a problem of screen burn-in is avoided, thereby prolonging a service life of a screen.

According to a second aspect, a mobile device is provided, and includes a display, a camera, one or more processors, a memory, and a plurality of programs. The plurality of programs are stored in the memory, and the plurality of programs include instructions. When the instructions are executed by the mobile device, the mobile device is enabled to perform the always on display method in any one of the first aspect or the possible implementations of the first aspect.

According to a third aspect, a graphical user interface on a mobile device is provided. The mobile device includes a display, a camera, a memory, and one or more processors. The one or more processors are configured to execute one or more computer programs stored in the memory. The graphical user interface includes a graphical user interface displayed when the mobile device performs the always on display method in any possible implementation of any of the foregoing aspects.

According to a fourth aspect, an apparatus is provided. The apparatus is included in a mobile device, and the apparatus has a function of implementing behavior of the mobile device in the first aspect and the possible implementations of the first aspect. The function may be implemented by hardware, or may be implemented by hardware executing corresponding software. The hardware or the software includes one or more modules or units corresponding to the foregoing function, for example, a display module or unit, a detection module or unit, or a processing module or unit.

According to a fifth aspect, a computer storage medium is provided, and includes computer instructions. When the computer instructions are run on a mobile device, the mobile device is enabled to perform the always on display method in any possible implementation of the first aspect.

According to a sixth aspect, a computer program product is provided. When the computer program product is run on a mobile device, the mobile device is enabled to perform the always on display method in any one of the first aspect or the possible implementations of the first aspect.

BRIEF DESCRIPTION OF DRAWINGS

FIG. 8 is a schematic flowchart of an always on display method according to an embodiment of this application;

DESCRIPTION OF EMBODIMENTS

The following describes the technical solutions in embodiments of this application with reference to the accompanying drawings in embodiments of this application. In the descriptions of embodiments of this application, unless otherwise specified, "/" means "or". For example, A/B may represent A or B. In this specification, "and/or" describes only an association relationship between associated objects and represents that three relationships may exist. For example, A and/or B may represent the following three cases: Only A exists, both A and B exist, and only B exists.

In the following description, the terms "first", "second", and "third" are merely used for a purpose of description, and cannot be understood as an indication or an implication of relative importance or an implicit indication of a quantity of indicated technical features. Therefore, a feature limited by "first", "second", or "third" may explicitly or implicitly include one or more features. In the description of embodiments, unless otherwise specified, "a plurality of" means two or more than two.

Embodiments of this application provide an always on display method. The method may be applied to a mobile device or an independent application. The always on display method provided in embodiments of this application may be applied to a mobile device such as a mobile phone, a tablet computer, a wearable device, a vehicle-mounted device, an augmented reality (augmented reality, AR) device/a virtual reality (virtual reality, VR) device, a notebook computer, an ultra-mobile personal computer (ultra-mobile personal computer, UMPC), a netbook, or a personal digital assistant (personal digital assistant, PDA). A specific type of the mobile device is not limited in embodiments of this application.

Figure 1:
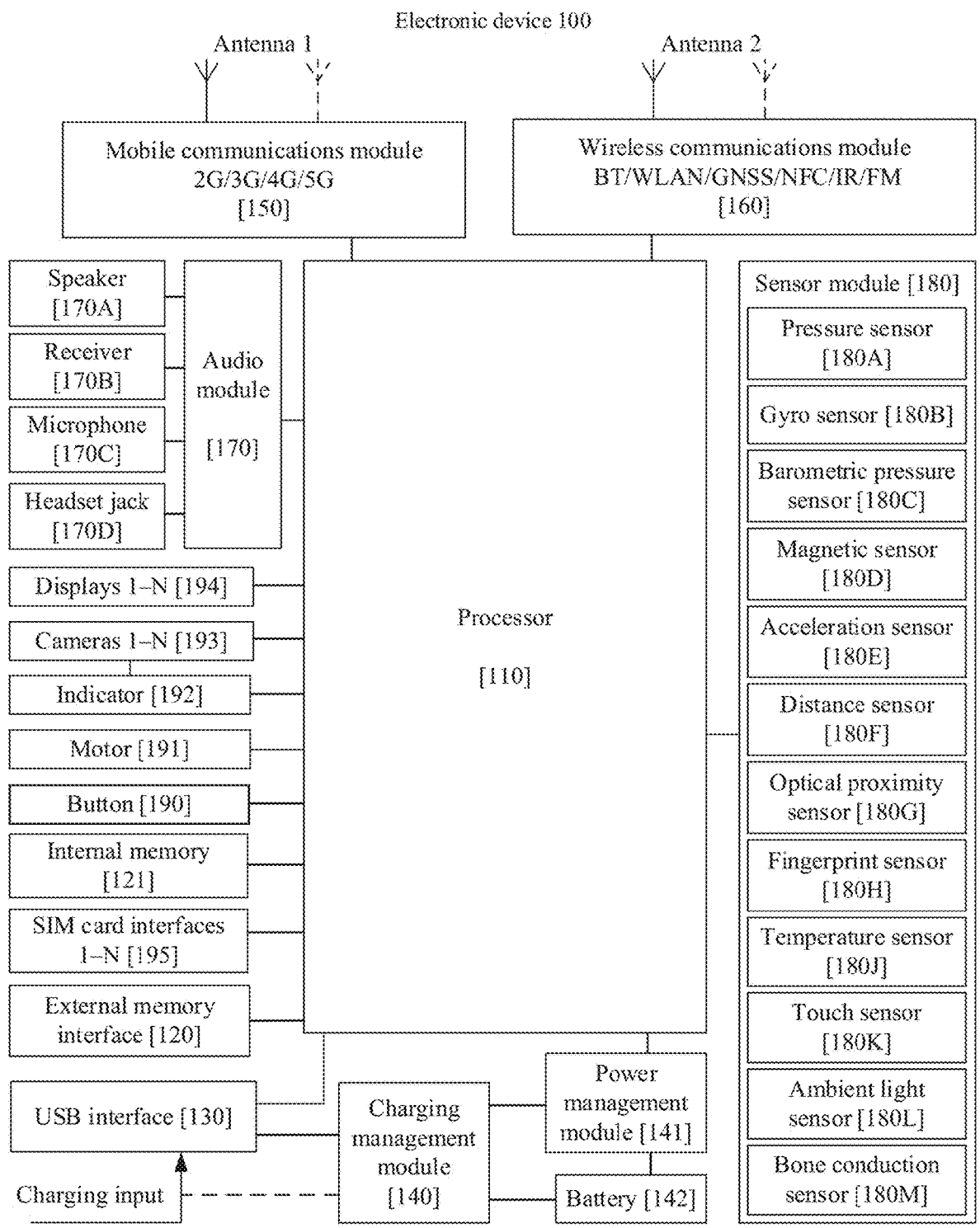
FIG. 1 is a schematic diagram of a structure of a mobile device according to this application.

For example, FIG. 1 is a schematic diagram of a structure of a mobile device 100. The mobile device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application constitutes no specific limitation on the mobile device 100. In some other embodiments of this application, the mobile device 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the mobile device 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access, reduces waiting time of the processor 110, to improving system efficiency.

In this application, the processor 110 may automatically determine a display policy based on a clock style set by a user, and send a display policy control instruction (for example, a switching instruction) to an integrated circuit (integrated circuit, IC) module of the display, to control the IC module of the mobile device to run an algorithm program obtained after switching to implement always on display of a corresponding clock style.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through an I2C interface, so that the processor 110 communicates with the touch sensor 180K through the I2C bus interface, to implement a touch function of the mobile device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may alternatively transfer an audio signal to the wireless communications module 160 through the PCM interface, to implement a function of answering a call by using the Bluetooth headset. Both the I2S interface and the PCM interface may be used for audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music by using the Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the mobile device 100. The processor 110 communicates with the display 194 through the DSI interface, to implement a display function of the mobile device 100.

The GPIO interface may be configured through software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB Type-C interface, or the like. The USB interface 130 may be configured to connect to a charger to charge the mobile device 100, or may be configured to transmit data between the mobile device 100 and a peripheral device, or may be configured to connect to a headset to play audio by using the headset. The interface may be further configured to connect to another mobile device, for example, an AR device.

It may be understood that an interface connection relationship between the modules illustrated in embodiments of this application is merely used as an example for description, and does not constitute a limitation on the structure of the mobile device 100. In some other embodiments of this application, the mobile device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the mobile device 100. When charging the battery 142, the charging management module 140 may further supply power to the mobile device by using the power management module 141.

The power management module 141 is configured to connect to the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the mobile device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the mobile device 100 may be configured to cover one or more communication frequency bands. Different antennas may be multiplexed to improve antenna utilization. For example, the antenna 1 may be multiplexed as a diversity antenna in a wireless local area network. In some other embodiments, the antenna may be used in combination with a timing switch.

The mobile communications module 150 may provide a solution to wireless communication such as 2G/3G/4G/5G applied to the mobile device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to a modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 may be disposed in a same device as at least some modules of the processor 110.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communications module 150 or another function module.

The wireless communications module 160 may provide a wireless communications solution that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, or the like and that is applied to the mobile device 100. The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, for the mobile device 100, the antenna 1 and the mobile communications module 150 are coupled, and the antenna 2 and the wireless communications module 160 are coupled, so that the mobile device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLO- NASS), a BeiDou navigation satellite system (BeiDou navigation satellite system, BDS), a quasi-zenith satellite system (quasi-zenith satellite system, QZSS), and/or satellite based augmentation systems (satellite based augmentation systems, SBAS).

The mobile device 100 implements the display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode or active-matrix organic light-emitting diode (active-matrix organic light emitting diode, AMOLED), a flex light-emitting diode (flex light-emitting diode, FLED), a mini-LED, a micro-LED, a micro-OLED, quantum dot light emitting diodes (quantum dot light emitting diodes, QLED), or the like. In some embodiments, the mobile device 100 may include one or N displays 194, where N is a positive integer greater than 1.

In this application, the display 194 may be an OLED display, and may be specifically a display in a video mode (video mode). The OLED display in the video mode includes no RAM, and an AOD function in this application is implemented by using a line buffer (line buffer) in the integrated circuit (integrated circuit, IC) module. The line buffer may store some pictures. However, full-screen display cannot be implemented, and display can be implemented only in some areas. For example, the line buffer may store a 1-bit algorithm program and a 2-bit algorithm program. After receiving an instruction sent by the processor, the IC module of the display invokes different algorithms for different clock styles, to implement always on display of a corresponding clock interface. In this application, the display 194 may be an OLED display, and may be specifically a display in a video mode (video mode). The OLED display in the video mode includes no RAM, and an AOD function in this application is implemented by using a line buffer (line buffer) in the integrated circuit (integrated circuit, IC) module. The line buffer may store some pictures. However, full-screen display cannot be implemented, and display can be implemented only in some areas. For example, the line buffer may store a 1-bit algorithm program and a 2-bit algorithm program. After receiving an instruction sent by the processor, the IC module of the display invokes different algorithms for different clock styles, to perform AOD display.

The mobile device 100 may implement the photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the mobile device 100 may include one or N cameras 193, where N is a positive integer greater than 1.

The digital signal processor is configured to process a digital signal, and may process another digital signal in addition to the digital image signal. For example, when the mobile device 100 selects a frequency, the digital signal processor is configured to perform Fourier transformation on frequency energy.

The video codec is configured to compress or decompress a digital video. The mobile device 100 may support one or more video codecs. Therefore, the mobile device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. An application such as intelligent cognition of the mobile device 100 may be implemented by using the NPU, for example, image recognition, face recognition, speech recognition, and text understanding.

The external memory interface 120 may be configured to connect to an external storage card such as a micro SD card, to extend a storage capability of the mobile device 100. The external memory card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121, to perform various function applications and data processing of the mobile device 100. The internal memory 121 may include a program storage area and a data storage area. The program storage area may store an operating system, an application required by at least one function (for example, a voice playing function or an image playing function), and the like. The data storage area may store data (for example, audio data and an address book) created in a process of using the mobile device 100. In addition, the internal memory 121 may include a high-speed random access memory, and may further include a nonvolatile memory, for example, at least one magnetic disk storage device, a flash storage device, or a universal flash storage (universal flash storage, UFS).

The mobile device 100 may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to: code and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The mobile device 100 may listen to music or answer a call in a hands-free mode by using the speaker 170A.

The receiver 170B, also referred to as an "earpiece", is configured to convert an audio electrical signal into a sound signal. When answering a call or receiving voice information, the mobile device 100 may receive a voice by placing the receiver 170B close to the human ear.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the mobile device 100. In some other embodiments, two microphones 170C may be disposed in the mobile device 100, to collect a sound signal and implement a noise reduction function. In some other embodiments, three, four, or more microphones 170C may alternatively be disposed in the mobile device 100, to collect a sound signal, implement noise reduction, and identify a sound source, so as to implement a directional recording function and the like.

The headset jack 170D is configured to connect to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. The gyro sensor 180B may be configured to determine a motion posture of the mobile device 100. In some embodiments, an angular velocity of the mobile device 100 around three axes (that is, axes X, Y, and Z) may be determined by using the gyro sensor 180B. The gyro sensor 180B may be configured to perform image stabilization during photographing. The barometric pressure sensor 180C is configured to measure barometric pressure. In some embodiments, the mobile device 100 calculates an altitude by using the barometric pressure measured by the barometric pressure sensor 180C, to assist in positioning and navigation. The magnetic sensor 180D includes a Hall sensor. The mobile device 100 may detect opening and closing of a flip cover by using the magnetic sensor 180D. In some embodiments, when the mobile device 100 is a flip phone, the mobile device 100 may detect opening and closing of a flip cover by using the magnetic sensor 180D. Further, a feature such as automatic unlocking upon opening of the flip cover is set based on a detected opening or closing state of the flip cover. The acceleration sensor 180E may detect a magnitude of acceleration of the mobile device 100 in various directions (usually on three axes). When the mobile device 100 is still, a magnitude and a direction of gravity may be detected. The acceleration sensor 180E may be further configured to recognize a posture of the mobile device, and is applied to an application such as switching between a landscape mode and a portrait mode and a pedometer. The distance sensor 180F is configured to measure a distance. The mobile device 100 may measure the distance through infrared or laser. The optical proximity sensor 180G may include, for example, a light-emitting diode (LED) and an optical detector such as a photodiode. The ambient light sensor 180L is configured to sense ambient light brightness. The mobile device 100 may adaptively adjust brightness of the display 194 based on the perceived ambient light brightness. The ambient light sensor 180L may be further configured to automatically adjust white balance during photographing. The ambient light sensor 180L may further cooperate with the optical proximity sensor 180G to detect whether the mobile device 100 is in a pocket, to prevent an unintentional touch. The fingerprint sensor 180H is configured to collect a fingerprint. The mobile device 100 may implement fingerprint unlocking, application lock access, fingerprint photographing, fingerprint-based call answering, and the like by using a feature of the collected fingerprint. The temperature sensor 180J is configured to detect a temperature. In some embodiments, the mobile device 100 executes a temperature processing policy by using the temperature detected by the temperature sensor 180J. The touch sensor 180K is also referred to as a "touch panel". The touch sensor 180K may be disposed on the display 194, and the touch sensor 180K and the display 194 form a touchscreen. The touch sensor 180K is configured to detect a touch operation performed on or near the touch sensor 180K. The touch sensor may transfer the detected touch operation to the application processor, to determine a type of a touch event. A visual output related to the touch operation may be provided on the display 194. In some other embodiments, the touch sensor 180K may alternatively be disposed on a surface of the mobile device 100 at a location different from that of the display 194. The bone conduction sensor 180M may obtain a vibration signal. In some embodiments, the bone conduction sensor 180M may obtain a vibration signal of a vibration bone of a human vocal part. The button 190 includes a power button, a volume button, and the like. The button 190 may be a mechanical button, or may be a touch button. The mobile device 100 may receive a button input, and generate a button signal input related to user settings and function control of the mobile device 100. The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder scenario, an information receiving scenario, an alarm clock scenario, and a game scenario) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to come into contact with and be separated from the mobile device 100. The mobile device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may also be compatible with different types of SIM cards. The SIM card interface 195 may also be compatible with an external storage card. The mobile device 100 interacts with a network by using the SIM card, to implement functions such as calling and data communication. In some embodiments, the mobile device 100 uses an eSIM, namely, an embedded SIM card. The eSIM card may be embedded into the mobile device 100, and cannot be separated from the mobile device 100.

A software system of the mobile device 100 may use a layered architecture, an event-driven architecture, a microkernel architecture, a micro service architecture, or a cloud architecture. In this embodiment of this application, a software structure of the mobile device 100 is described by using an Android system with a layered architecture as an example.

Figure 2:
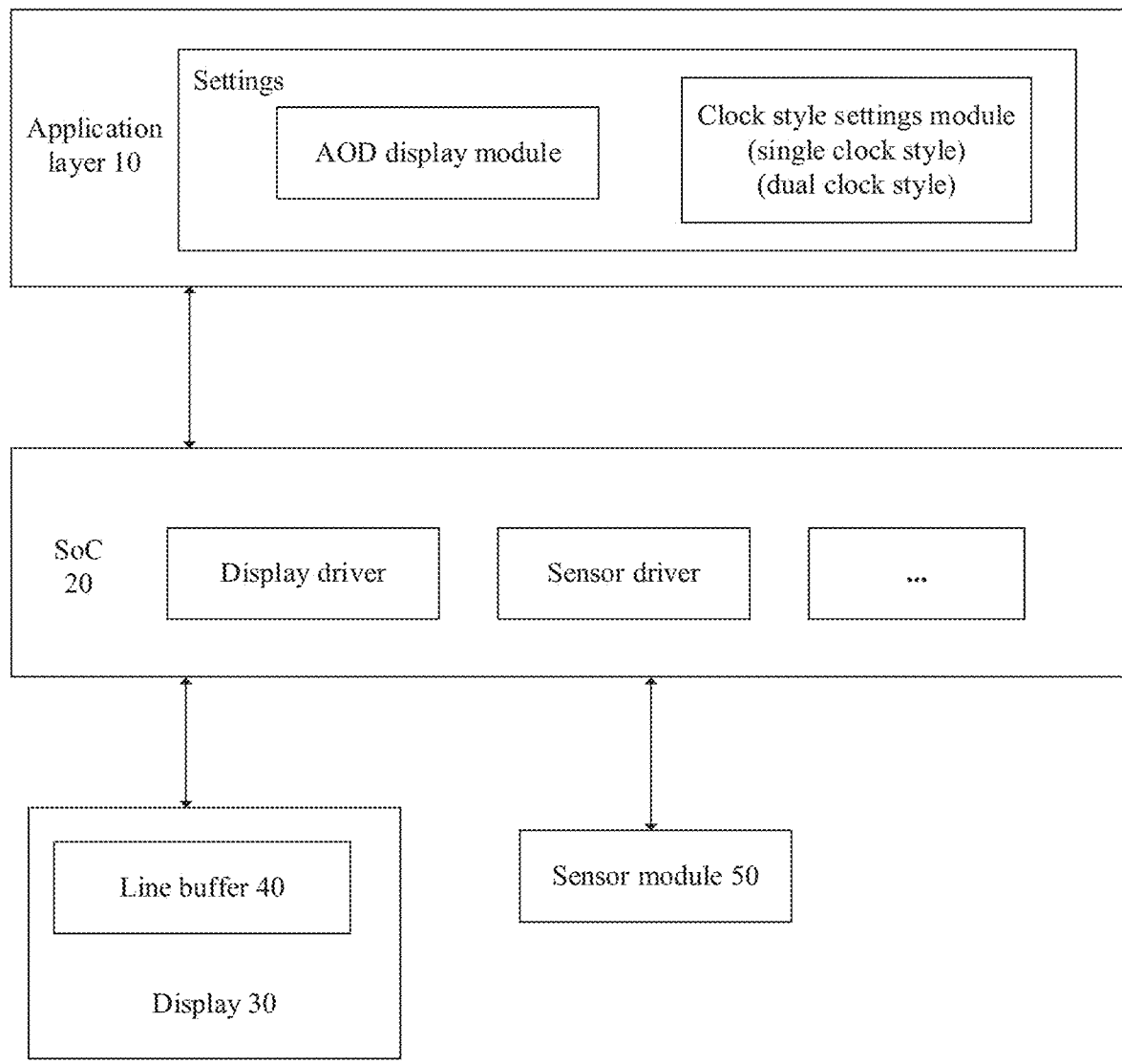
FIG. 2 is a block diagram of a software structure of a mobile device according to an embodiment of this application.

FIG. 2 is another block diagram of a layered structure of a mobile device 100 according to an embodiment of this application. In the layered architecture, software is divided into several layers, and each layer has a clear role and task. The layers communicate with each other through a software interface. In some embodiments, as shown in FIG. 2, the mobile device may include an application layer 10, a system on chip (system on chip, SOC) 20, a display 30, and a sensor module 50. In this embodiment of this application, for an OLED display in a video mode, the display module 30 may further include a line buffer (line buffer) 40.

The application layer 10 may include a series of application packages. As shown in FIG. 2, the application package may include a settings application. In addition, it should be understood that the application layer may further include other applications such as Album, Calendar, Phone, Map, Navigation, WLAN, Bluetooth, Music, Video, and Messaging. This is not limited in this application.

In this application, the settings application at the application layer 10 includes an AOD display module for performing always on display and a clock style settings module. The AOD display module may correspond to an "always on display" switch in the settings application, and a user may enable or disable an always on display function of the mobile device by using the "always on display" switch. The clock style settings module may correspond to a dual clock switch in a date and time menu in the settings application, and the user may enable or disable a dual clock display function of the mobile device by using the "dual clock" switch.

It should be understood that a first clock interface may be a clock interface in a single clock style, and a second clock interface may be a clock interface in a multi-clock style (for example, a dual clock style or a triple clock style). Alternatively, a first clock interface may be a clock interface in a multi-clock style (for example, a dual clock style or a triple clock style), and a second clock interface may be a clock interface in a single clock style. In addition, always on display (always on display, AOD) may also be referred to as always on display, always on display, and the like. This is not limited herein. In addition to time information, content for always on display further includes but is not limited to at least one of the following: any content that needs to be notified, for example, a date, weather, a temperature, an unread message, battery level information, and a missed call. This is not limited in this application.

The SoC 20 may include a complete central processing unit (central processing unit, CPU), a read-only memory (read-only memory, ROM), a random access memory (random access memory, RAM), and the like. The SoC 20 serves as a control center of the mobile device, connects all parts of the entire mobile device by using various interfaces and lines, and performs various functions of the mobile device and data processing by running or executing a software program and/or a module stored in the memory and invoking data stored in the memory.

The SoC 20 may include various types of drivers. For example, in this application, the SoC 20 may include a display driver module and a sensor driver module. The display driver module is used for display on a display. The sensor driver module is used by various types of sensors to detect an input signal, for example, is used by a touch sensor to detect a touch operation performed by the user. Details are not described herein.

For the display 30, refer to the display 194 described in FIG. 1. Details are not described herein.

Figures 3A, 3B:
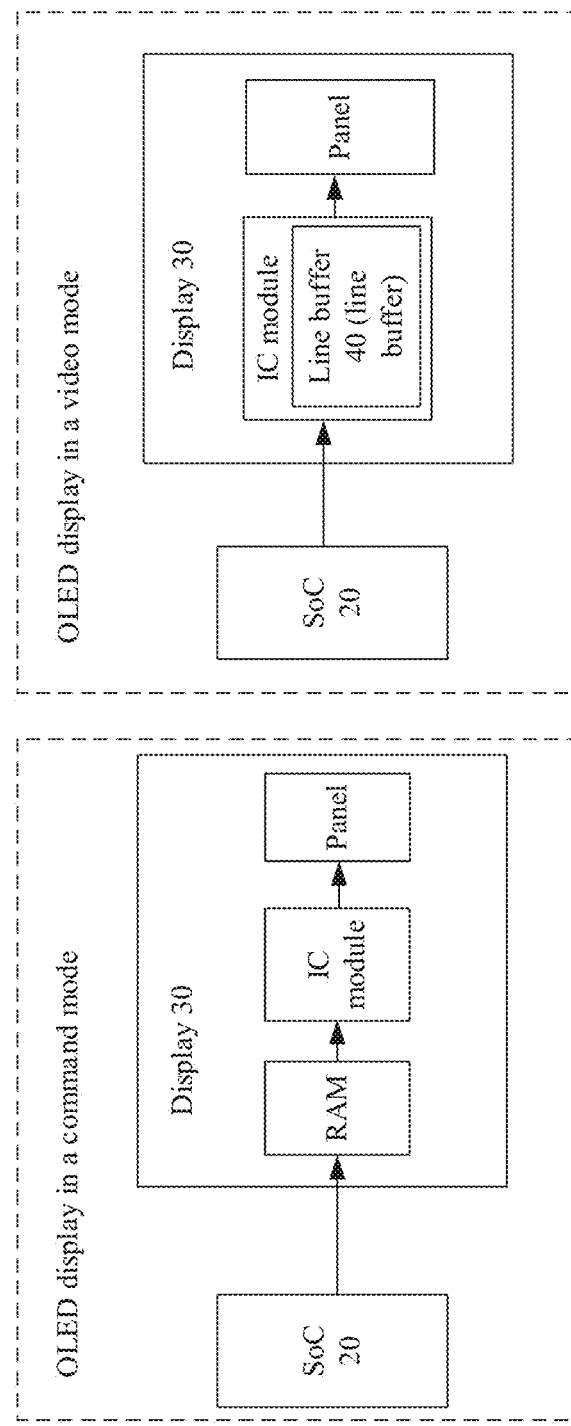
FIG. 3(a) and FIG. 3(b) are a schematic diagram of structures of two displays according to an embodiment of this application.

FIG. 3(*a*) and FIG. 3(*b*) are a schematic diagram of structures of two displays according to an embodiment of this application. Currently, an OLED display is used for an AOD function. Two current OLED displays are described in the background. An OLED display in a command mode performs display refresh by using an internal RAM, and an OLED display in a video mode includes no RAM, and an IC module of a display 30 immediately send data to a panel through refresh.

A difference between the OLED display in the command mode and the OLED display in the video mode is described below with reference to a diagram of architectures of the two displays in FIG. 3(*a*) and FIG. 3(*b*). A structure of the OLED display in the command mode may be shown in FIG. 3(*a*). The OLED display in the command mode includes the RAM, data of an SoC 20 may be first sent to the RAM in the display at a speed of 60 Hz, and then an IC module of a display 30 extracts the data from the RAM, and sends the data to a panel through refresh. If there is no data refresh, the SoC 20 may stop data sending, and the IC module of the display continuously extracts data from the RAM, sends the data to the panel through refresh, and maintains a refresh rate of 60 Hz.

A structure of the OLED display in the video mode may be shown in FIG. 3(*b*). The OLED display in the video mode includes no RAM, data of the SoC 20 is sent to the IC module of the display 30 at a speed of 60 Hz, and the IC module of the display 30 immediately sends the data to the panel through refresh. Regardless of whether there is data refresh, the SoC 20 needs to maintain a refresh rate of 60 Hz to send data to the display 30 for display on the panel of the display 30. Specifically, the IC module of the display 30 of the OLED display in the video mode includes a line buffer (line buffer), and the OLED display in the video mode is implemented by using the line buffer in the IC. The line buffer may store some pictures. However, full-screen cannot be implemented, and display can be implemented only in some areas.

For ease of understanding, in this application, an always on display method is described by using a mobile device in the structures shown in FIG. 1 and FIG. 2 as an example. The mobile device includes an OLED display in a video mode shown in FIG. 3(*b*). The always on display method provided in embodiments of this application is described below in detail with reference to the accompanying drawings and an application scenario.

It should be understood that description is provided below by using a mobile phone as an example, and this constitutes no limitation. A corresponding method is also applicable to a mobile device such as a tablet computer, a wearable device, a vehicle-mounted device, an AR device, a VR device, a notebook computer, an ultra-mobile personal computer, a netbook, or a personal digital assistant.

Figure 4A:
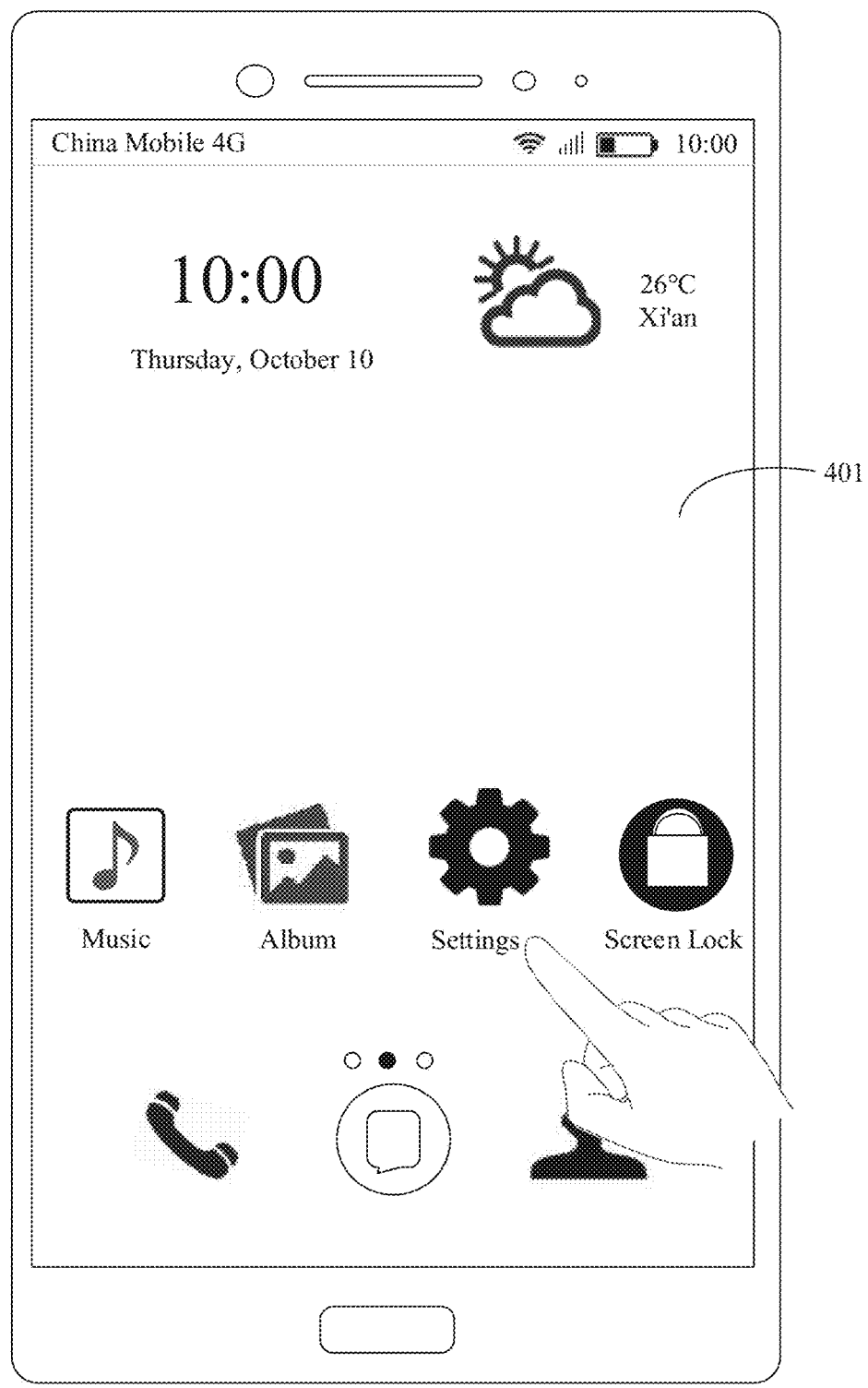
FIG. 4(a), FIG. 4(b), FIG. 4(c), and FIG. 4(d) are a schematic diagram of a graphical user interface for setting AOD display according to an embodiment of this application.

FIG. 4(a), FIG. 4(b), FIG. 4(c), and FIG. 4(d) are a schematic diagram of a graphical user interface (graphical user interface, GUI) for setting AOD display according to an embodiment of this application. FIG. 4(a) shows an interface that exists after a mobile phone is unlocked. A screen display system of the mobile phone displays currently output interface content 401. The interface content 401 may be a home screen of the mobile phone. The interface content 401 displays a plurality of applications (application, App), for example, Music, Album, Camera, and Settings. It should be understood that the interface content 401 may further include more other applications. This is not limited in this application.

Figure 4B:
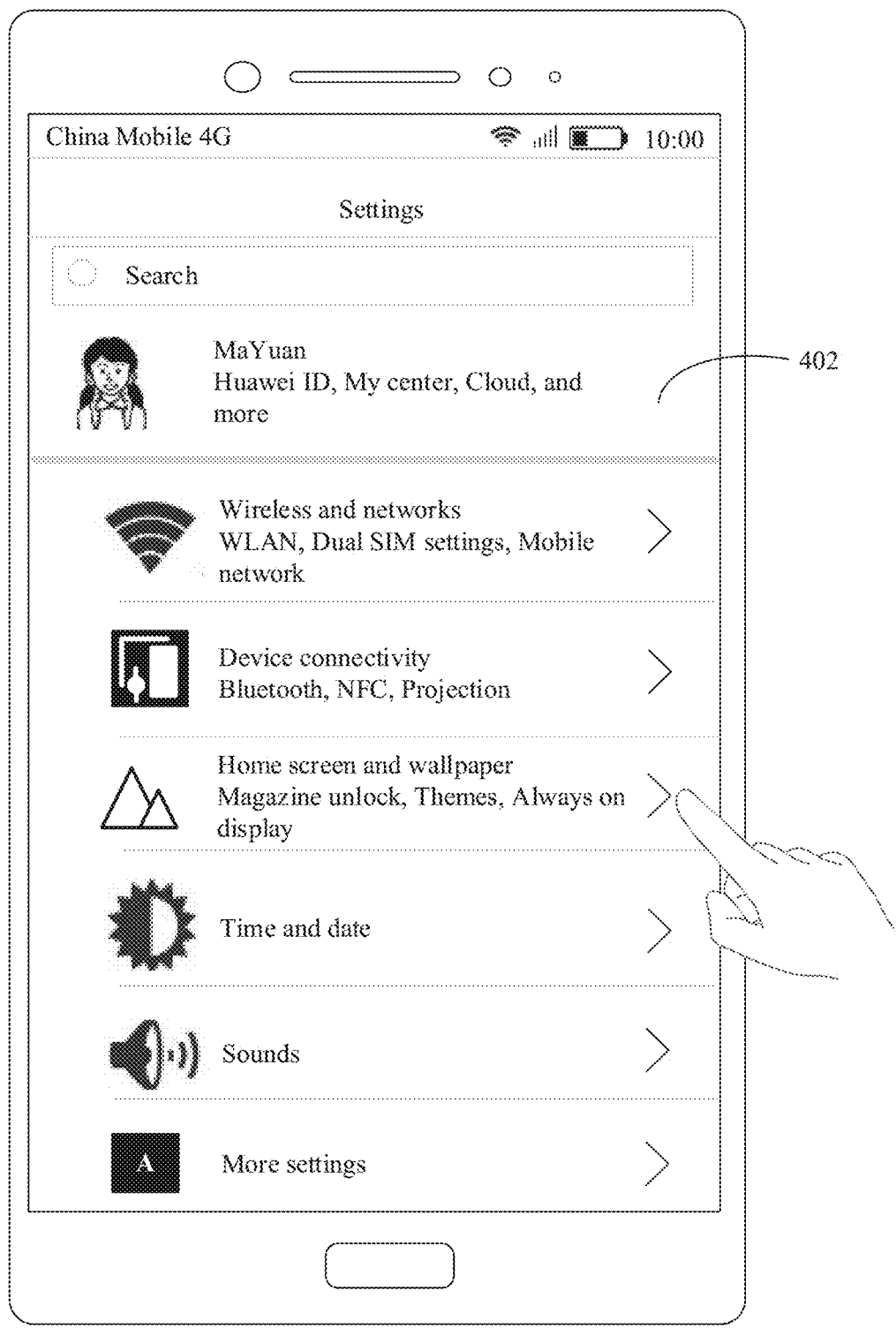

As shown in FIG. 4(a), a user performs a tap operation on the settings application, and in response to the tap operation performed by the user, the mobile phone displays a settings main interface 402 shown in FIG. 4(b). The settings main interface 402 may include a plurality of menu options, for example, a wireless and networks option, a device connectivity option, a home screen and wallpaper option, a time and date option, and a sounds option shown in FIG. 4(b). The user performs a tap operation on the home screen and wallpaper option, and in response to the tap operation performed by the user, the mobile phone displays a home screen and wallpaper interface 403 shown in FIG. 4(c). The interface 403 may include an "always on display" switch.

Figure 4C:
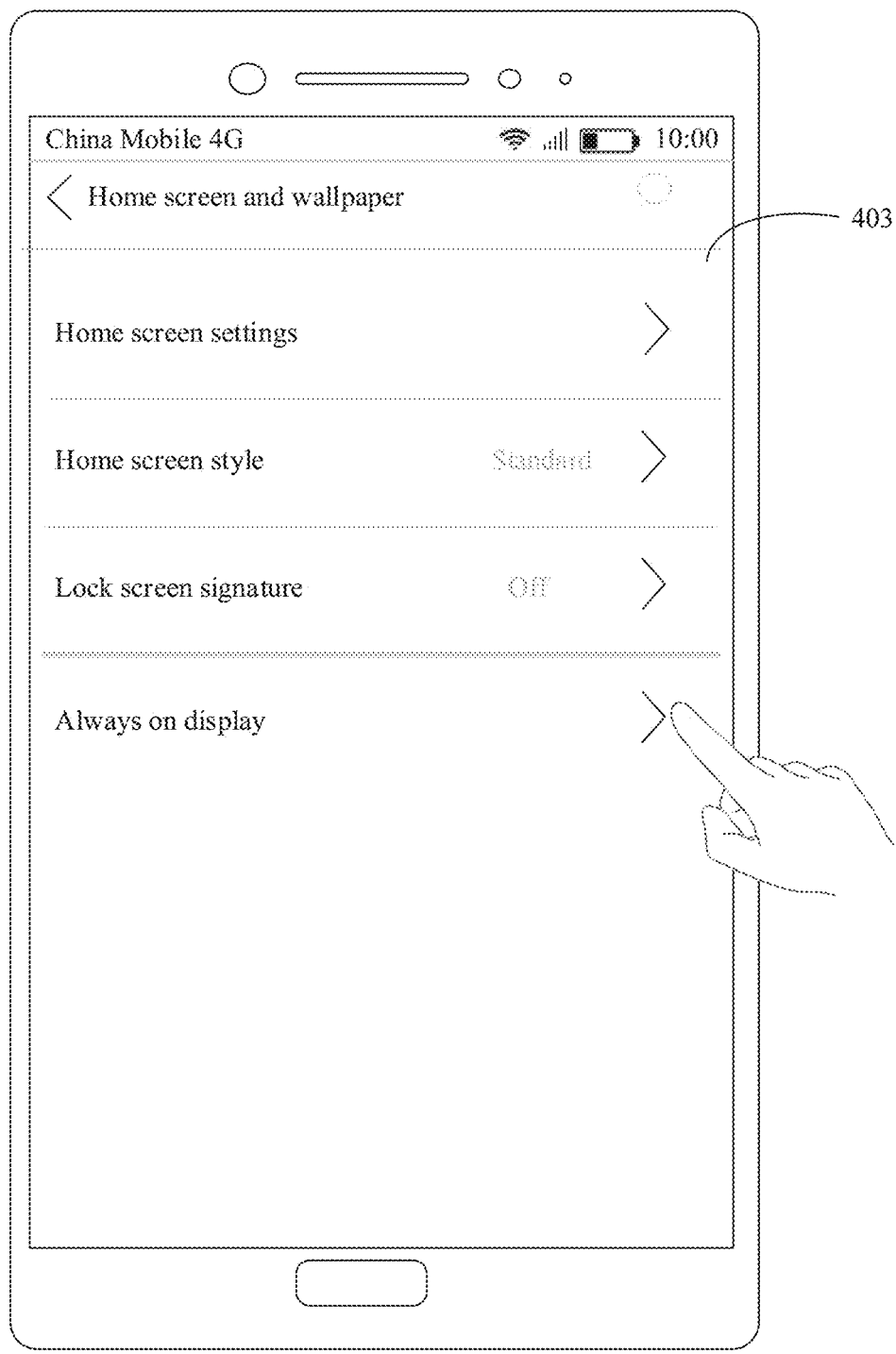
Figure 4D:
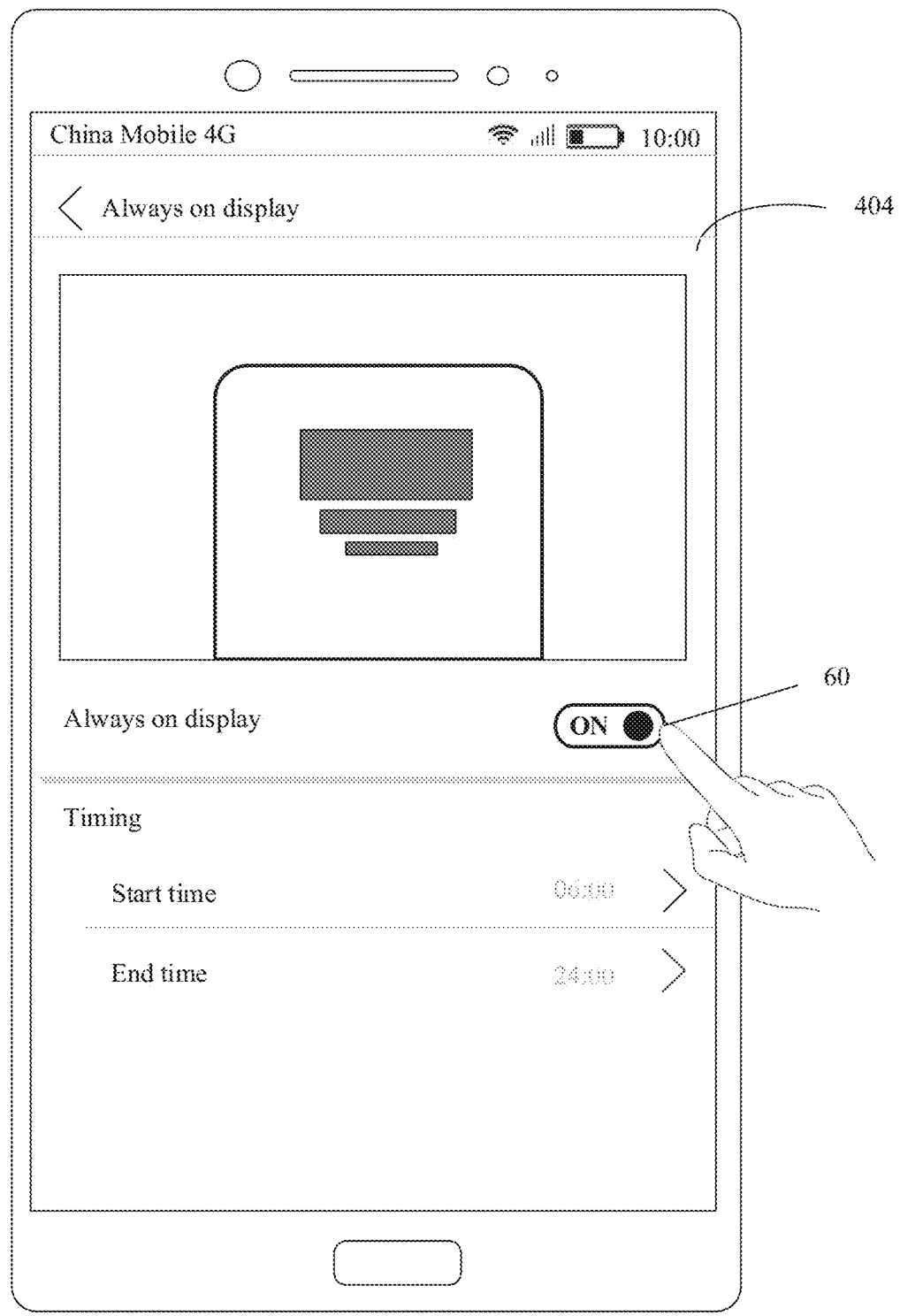

As shown in FIG. 4(c), the user performs a tap operation on the "always on display" switch, and in response to the tap operation performed by the user, the mobile phone displays an always on display function interface 404 shown in FIG. 4(d). The interface 404 includes a plurality of function menus related to always on display of the mobile phone, for example, options such as the always on display switch and a start time and an end time for always on display. When the user turns on the "always on display" switch 60, an always on display function is enabled for the mobile phone.

FIG. 5(a), FIG. 5(b), FIG. 5(c), FIG. 5(d), and FIG. 5(e) are a schematic diagram of a graphical user interface for AOD display according to this application. For example, after a user turns on an "always on display" switch 60 by performing the operation in FIG. 4(a), FIG. 4(b), FIG. 4(c), and FIG. 4(d), the user may further set a clock style of a mobile phone. The clock style includes a single clock style and a multi-clock style (in this application, a dual clock style is used as an example for description). It should be understood that a clock style of a mobile device may further include more option styles, for example, a plurality of clock types such as a triple clock style and a quadruple clock style. In this application, a clock display policy of the mobile device is described by using the single clock style and the dual clock style as an example. This is not limited in this application. A default clock style is usually the single clock style.

Figure 5A:
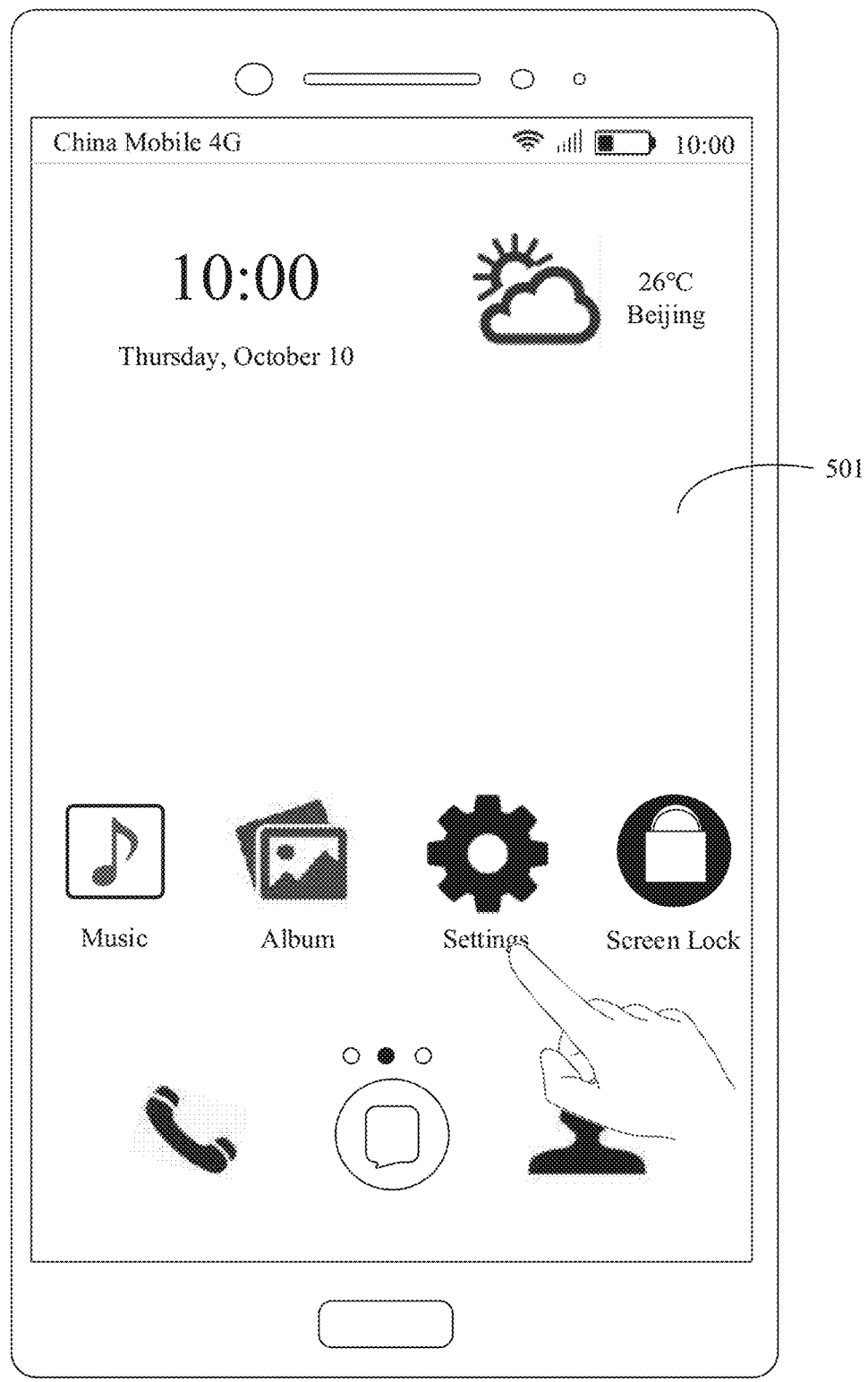
FIG. 5(a), FIG. 5(b), FIG. 5(c), FIG. 5(d), and FIG. 5(e) are a schematic diagram of a graphical user interface for AOD display according to this application.
Figure 5B:
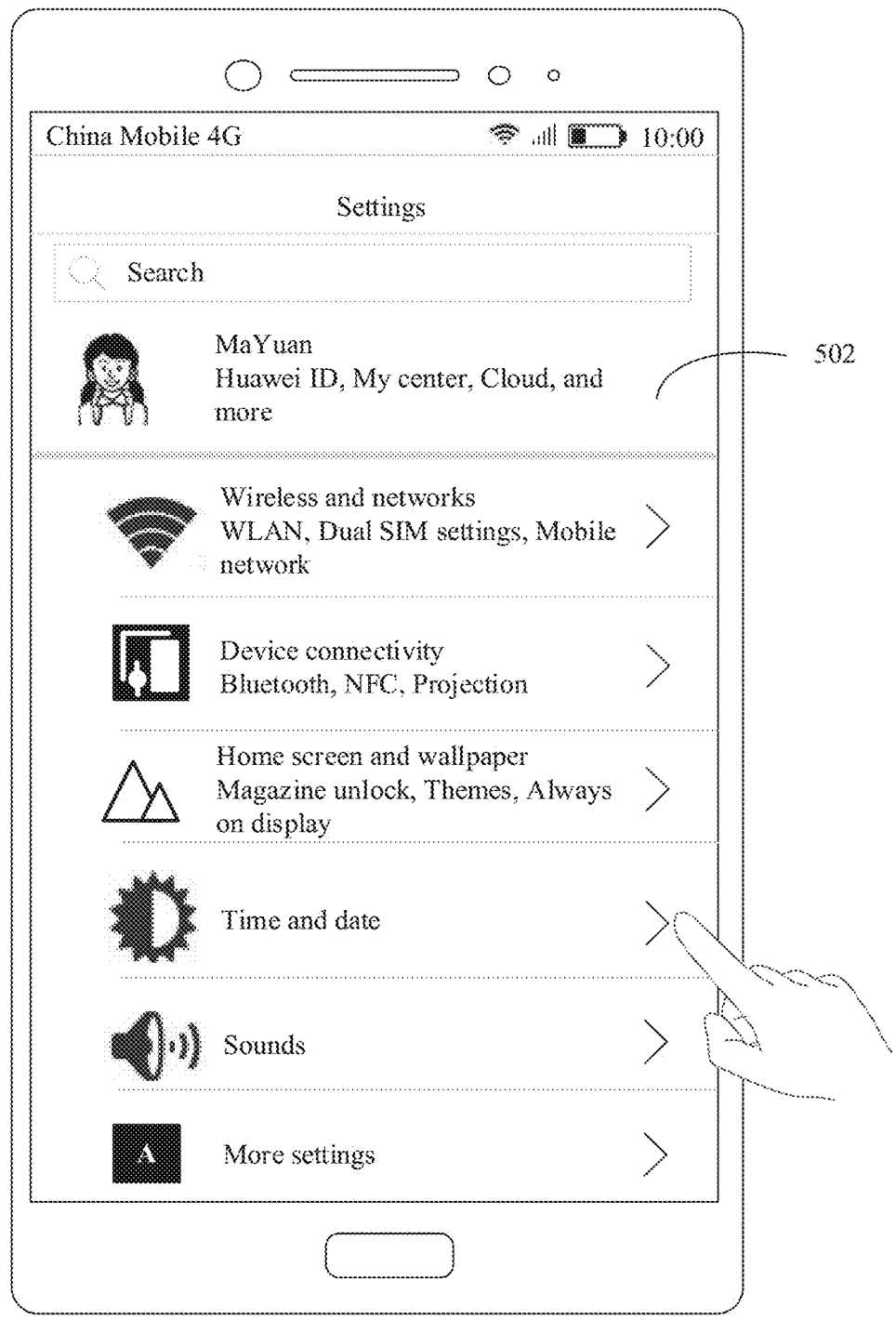

As shown in FIG. 5(a), the user performs a tap operation on a settings application, and in response to the tap operation performed by the user, the mobile phone displays a main interface 502, of the settings application, shown in FIG. 5(b). The settings main interface 502 may include a plurality of menu options. The user performs a tap operation on a "time and date" option, and in response to the tap operation performed by the user, the mobile phone displays an interface 503, of the "time and date" option, shown in FIG. 5(c). The interface 503 may include a "dual clock" switch.

Figure 5C:
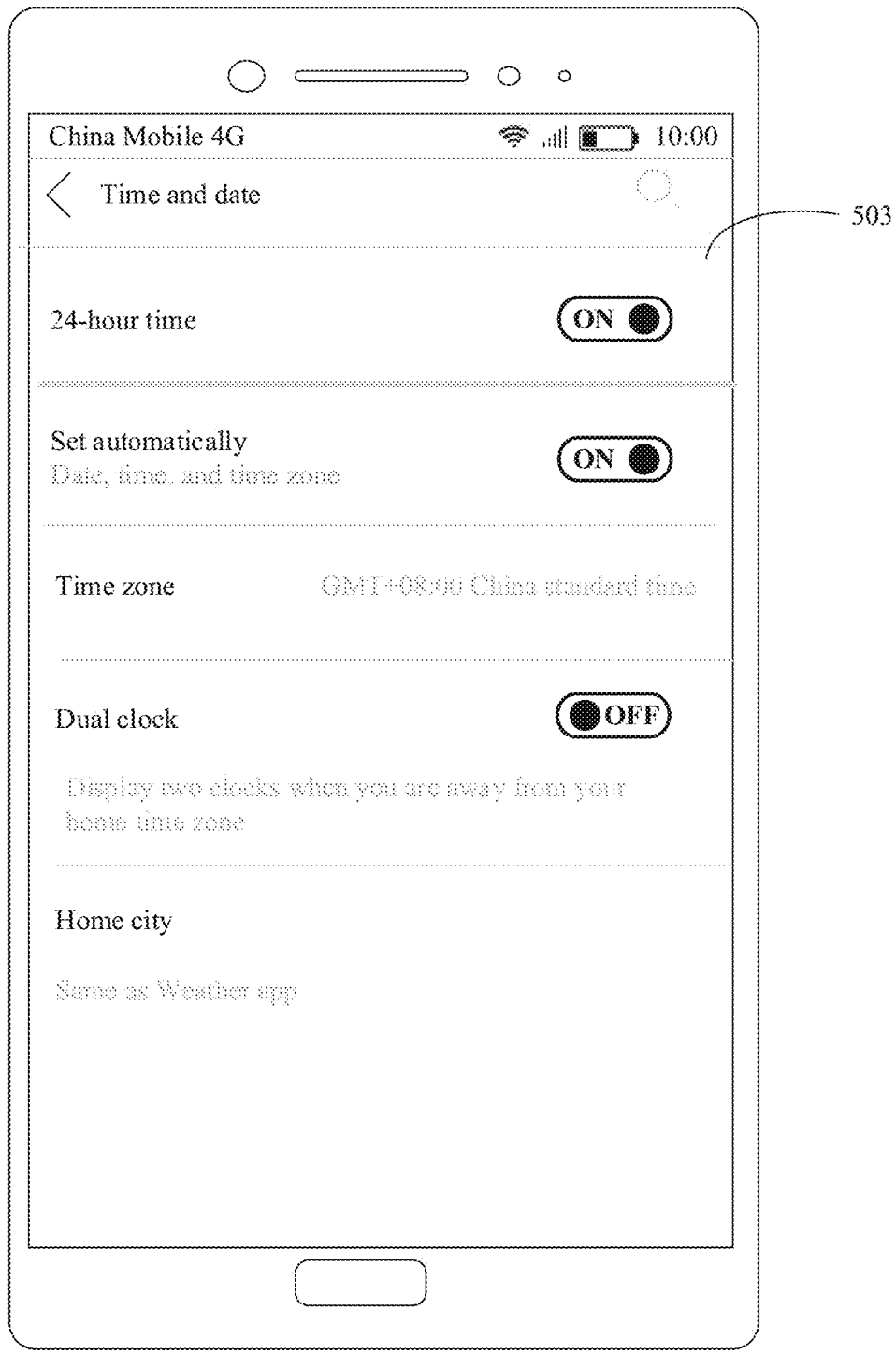

As shown in FIG. 5(c), when the user performs no setting, it may be considered by default for the mobile phone that the "dual clock" switch is in an off (OFF) state, in other words, a current clock style of the mobile phone is the single clock style. Alternatively, the user taps, on the interface 503, the "dual clock" switch to enable the "dual clock switch" to be in an off state, so that a current clock style of the mobile phone is the single clock style. This is not limited in this application.

Figure 5D:
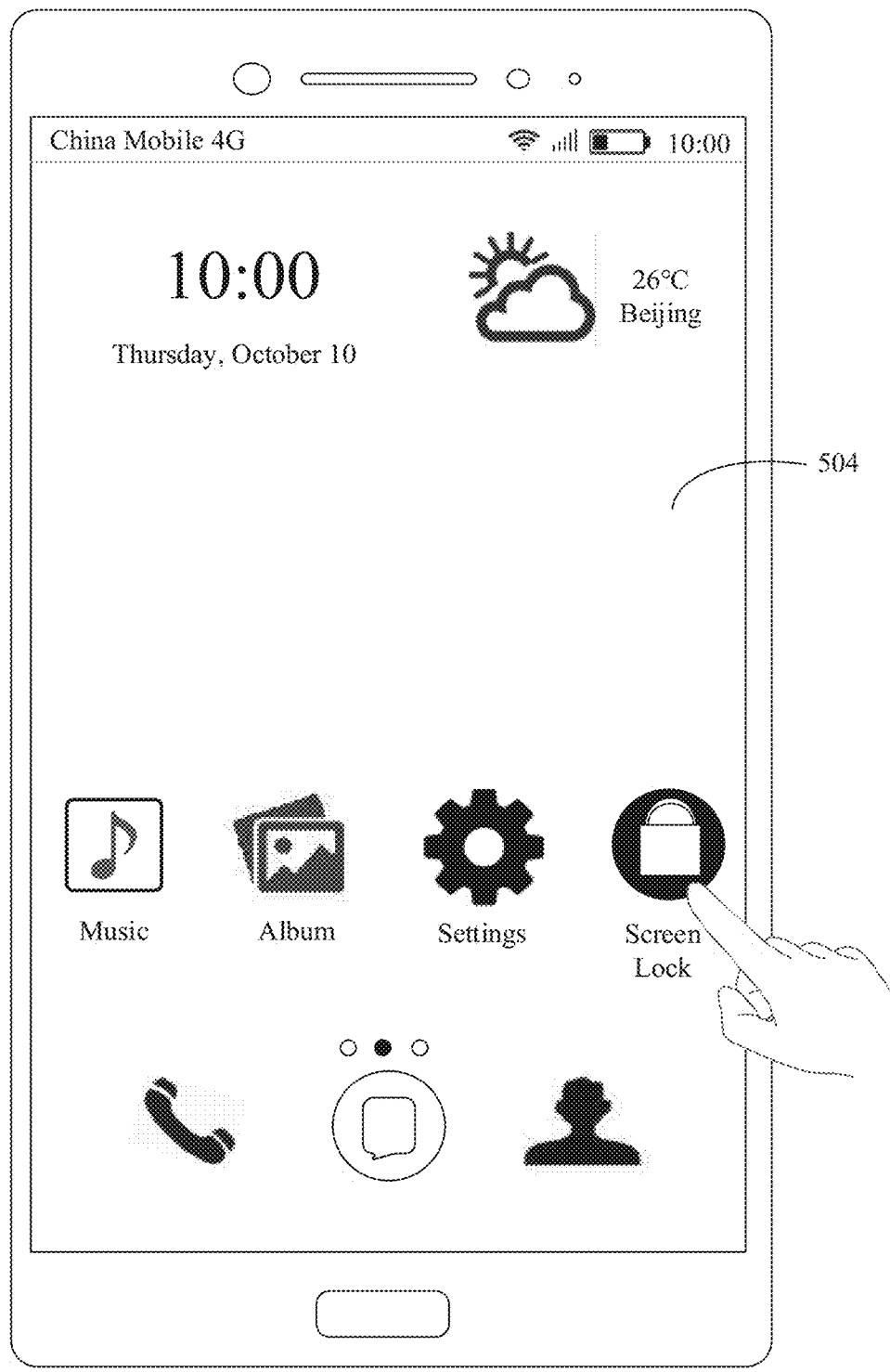

After the operations in FIG. 4(a), FIG. 4(b), FIG. 4(c), and FIG. 4(d), and FIG. 5(a) to FIG. 5(c) are performed, an always on display function is currently enabled for the mobile phone, and always on display may be performed for a single clock interface. As shown in FIG. 5(d), the user taps a screen lock application on a home screen, or presses a mechanical screen lock button, and the mobile phone enters an always on display state. In response to the screen lock operation performed by the user, the mobile phone may display a single clock display interface 505 shown in FIG. 5(e).

The single clock display interface 505 may include a current location "Beijing, China" of the mobile phone, current time, a date, information, a current battery level of the mobile phone, weather, and the like. In addition, another application, for example, Music, currently running in the mobile phone may be further displayed. It should be understood that content and a quantity of pieces of content displayed on the single clock display interface 505 are not limited in this application.

Figure 6A:
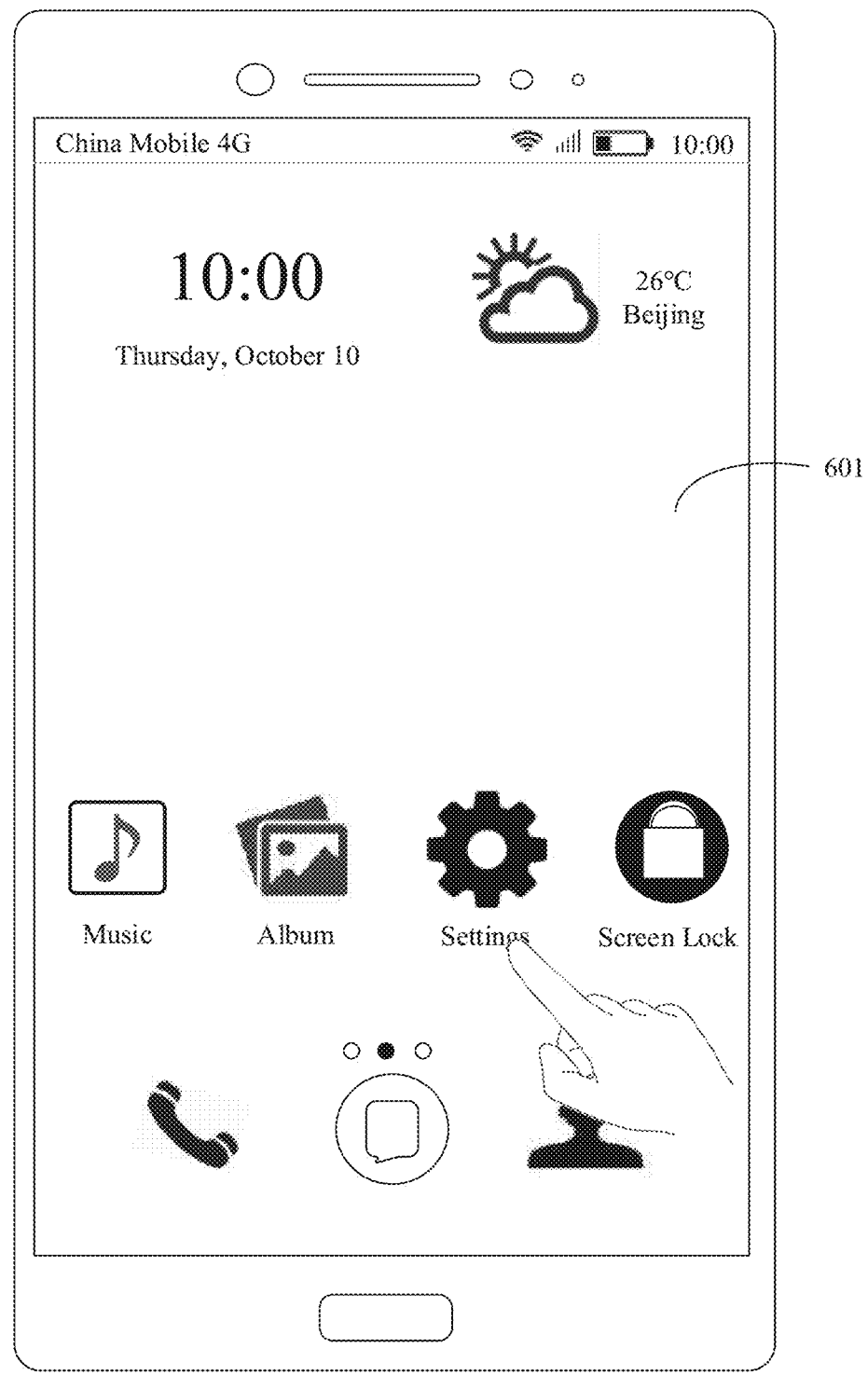
FIG. 6(a), FIG. 6(b), FIG. 6(c), FIG. 6(d), and FIG. 6(e) are another schematic diagram of a graphical user interface for AOD display according to this application.
Figure 6B:
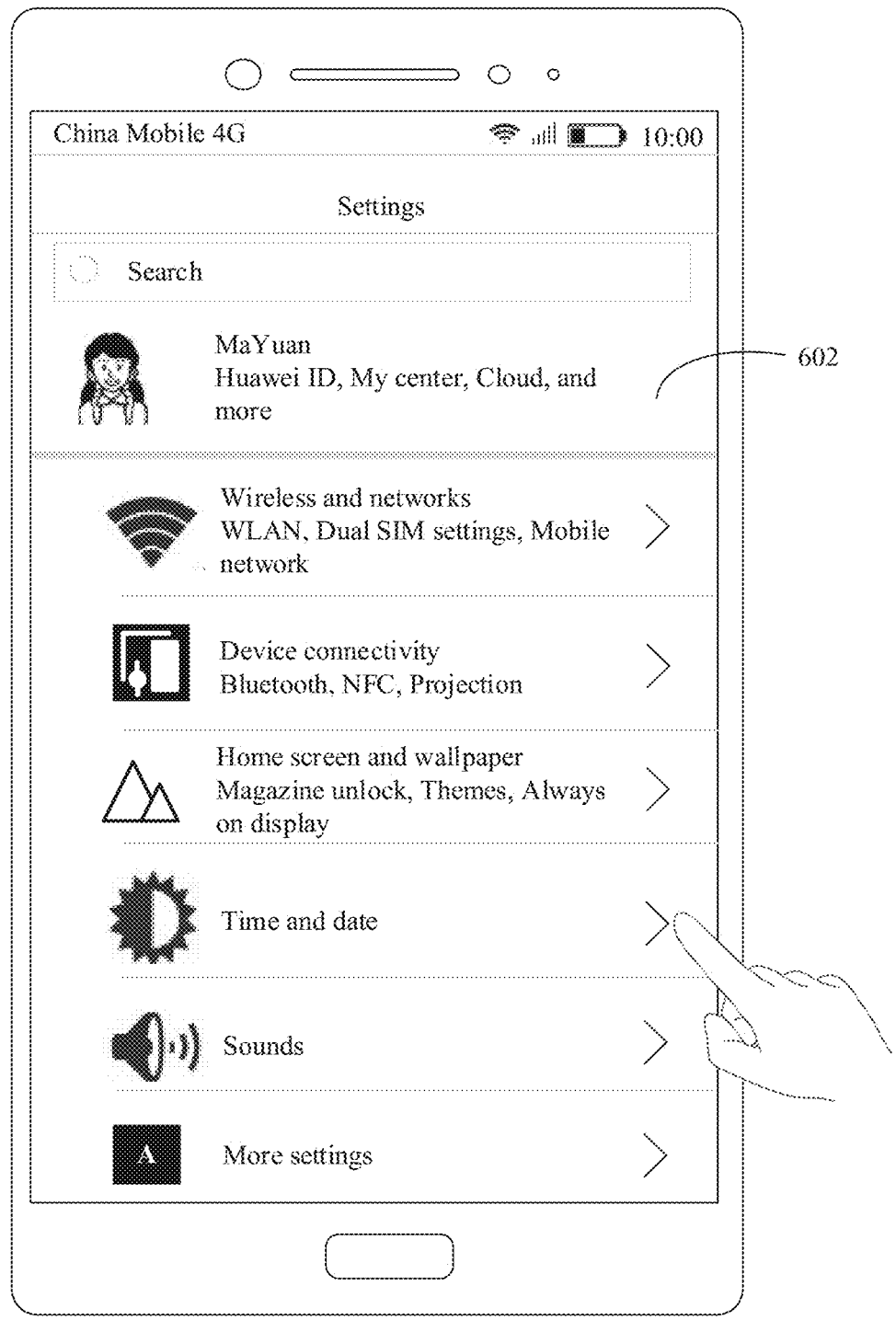

FIG. 6(a), FIG. 6(b), FIG. 6(c), FIG. 6(d), and FIG. 6(e) are another schematic diagram of a graphical user interface for AOD display according to this application. For example, after a user turns on an "always on display" switch 60 by performing the operation in FIG. 4(a), FIG. 4(b), FIG. 4(c), and FIG. 4(d), as shown in FIG. 6(a), the user performs a tap operation on a settings application, and in response to the tap operation performed by the user, a mobile phone displays a main interface 602, of the settings application, shown in FIG. 6(b). The user performs a tap operation on a "time and date" option, and in response to the tap operation performed by the user, the mobile phone displays an interface 603, of the "time and date" option, shown in FIG. 6(c). The interface 603 may include a "dual clock" switch.

Figure 6C:
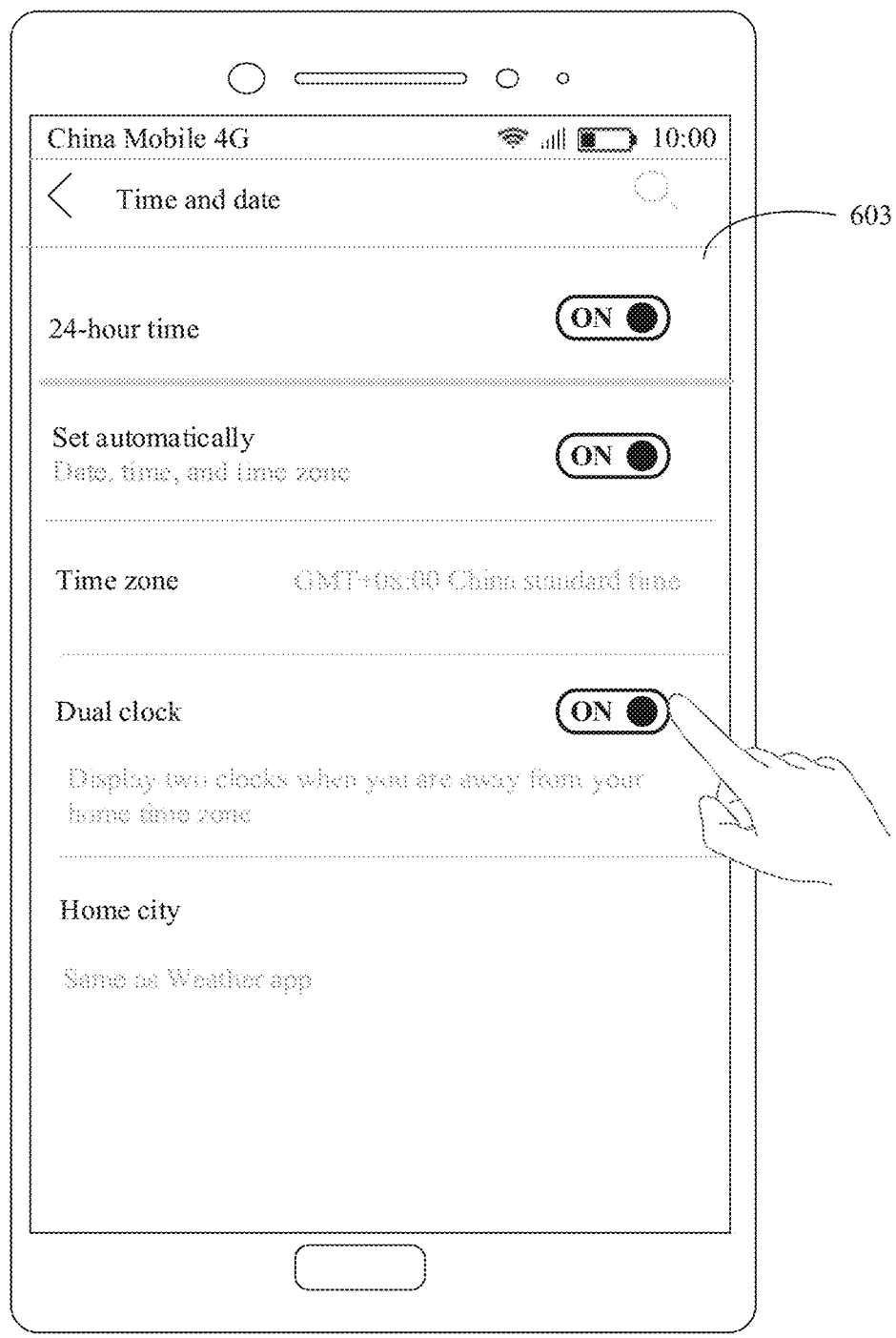

As shown in FIG. 6(c), the user performs a tap operation on the "dual clock" switch, and in response to the tap operation performed by the user, the mobile phone may enable the "dual clock" switch to be in an on (ON) state, in other words, a current clock display style of the mobile phone is a dual clock style.

Figure 6D:
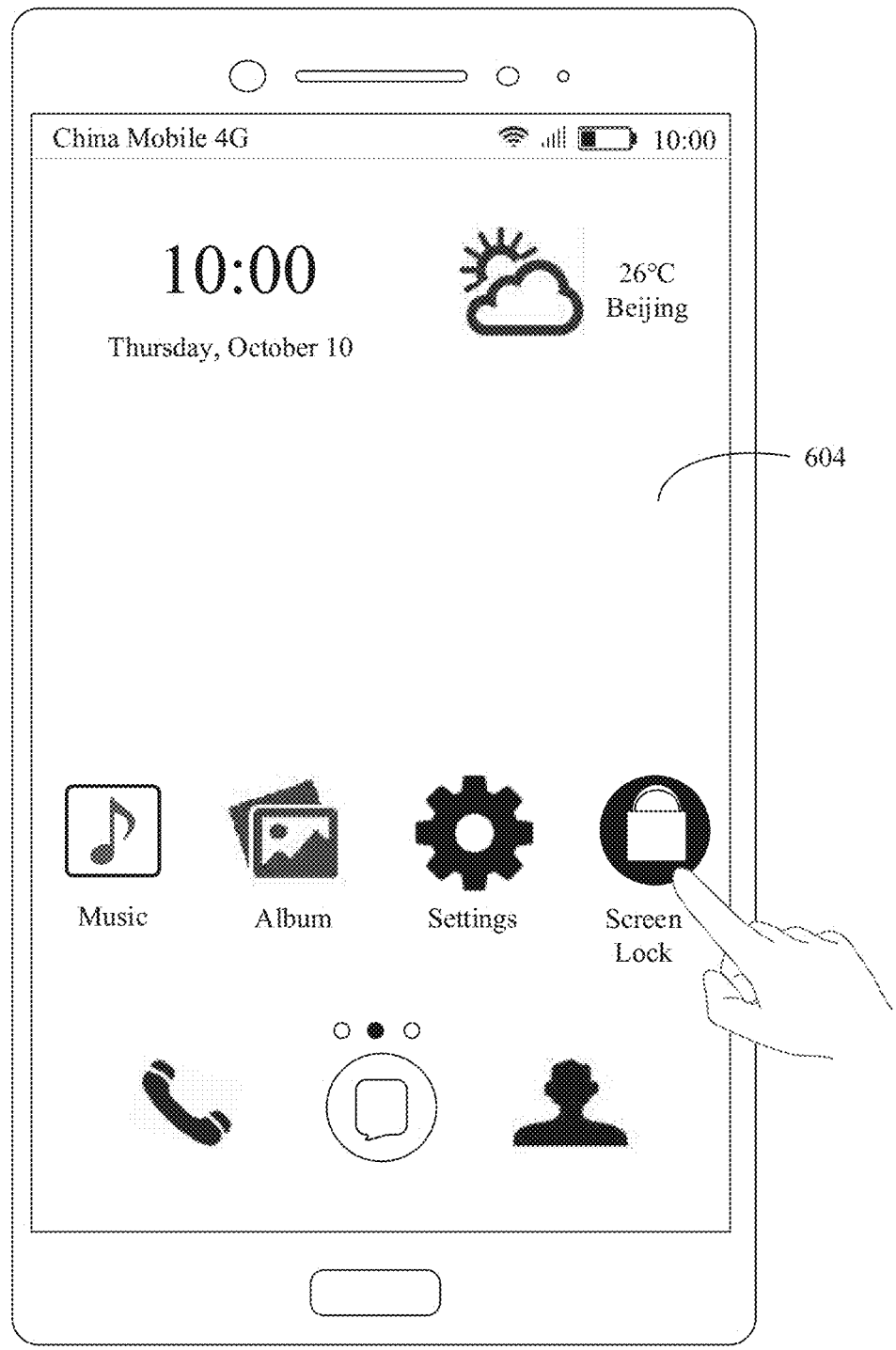

After the operations in FIG. 4(a), FIG. 4(b), FIG. 4(c), and FIG. 4(d), and FIG. 6(a) to FIG. 6(c) are performed, an always on display function is currently enabled for the mobile phone, and the display style is the dual clock style. As shown in FIG. 6(d), the user taps a screen lock application on a home screen, or presses a mechanical screen lock button, and the mobile phone enters an always on display state. In response to the screen lock operation performed by the user, the mobile phone may display a dual clock display interface 605 shown in FIG. 6(e).

Optionally, the dual clock interface 605 may include a common location "Beijing, China" and a current location "New York, USA" of the mobile phone, current time and dates respectively corresponding to the two locations, information, a current battery level of the mobile phone, weather, and the like. In addition, another application, for example, Music, currently running in the mobile phone may be further displayed. It should be understood that content and a quantity of pieces of content displayed on the dual clock interface 605 are not limited in this application.

It should be understood that when the display style of the mobile phone is the dual clock style, the mobile phone may display the dual clock interface when the current location and a home city differ in time zone. That is, the mobile phone displays two clocks on a screen lock interface of the mobile phone, or the mobile phone displays two clocks on the home screen of the mobile phone. This is not limited in this application.

For example, the manner of displaying two clocks may be used when the common location of the user changes or when a timing mode at the common location changes. Alternatively, the manner of displaying two clocks may be used when the user adds two different locations. This is not limited in this application. For example, if the common location of the user is Beijing, China, when the mobile phone detects that the current location changes to New York, USA, or the mobile phone detects that the current timing mode changes (for example, changes from GMT+08:00 to eastern standard time), the mobile phone displays an interface of two clocks of the common location and the current location in the always on display state. Alternatively, the user adds Beijing and Shanghai as common locations, and the mobile phone may display an interface of two clocks in the always on display state. On the interface, same time is displayed, different weather may be displayed, and so on. This is not limited in this application.

The AOD function of the mobile phone in this application is described above with reference to FIG. 4(*a*), FIG. 4(*b*), FIG. 4(*c*), and FIG. 4(*d*) to FIG. 6(*a*), FIG. 6(*b*), FIG. 6(*c*), FIG. 6(*d*), and FIG. 6(*e*). It should be understood that currently, OLED displays are used for the AOD function. The OLED displays include a video mode (video mode) and a command mode (command mode). An OLED display in the video mode includes no RAM, and needs to continuously refresh a display panel. Therefore, a frame buffer is not needed, in other words, no random access memory (random access memory, RAM) is needed in the display. Based on the description in FIG. 3(*b*), it may be learned that the AOD function of the OLED display in the video mode is implemented by using a line buffer (line buffer) in an integrated circuit (integrated circuit, IC) of the display. The line buffer may store some pictures. However, full-screen display cannot be implemented, and display can be implemented only in some areas.

The line buffer mainly displays an AOD technology by using two implementations. Specifically, a 1-bit algorithm program and a 2-bit algorithm program are included. FIG. 7(*a*) and FIG. 7(*b*) are a schematic diagram of an AOD display area according to an embodiment of this application. A rectangular coordinate system XOY is established by using an upper left corner of a display of a mobile phone as an origin O. In this application, a mobile phone with resolution of 1080×2400 is used as an example. There are 1080 pixels on an X axis and 2400 pixels on a Y axis.

FIG. 7(*a*) is a schematic diagram of a display area corresponding to the AOD function for which the 1-bit algorithm program is used. As shown in FIG. 7(*a*), when the AOD function is implemented by using the 1-bit algorithm program, the display area is a shadow area in FIG. 7(*a*), ranges from 0 to 1080 in an X direction, and ranges from 300 to 1370 in a Y direction. When in an always on display state, the mobile phone may display a single clock interface and a multi-clock interface in the shadow area.

FIG. 7(*b*) is a schematic diagram of a display area corresponding to the AOD function for which the 2-bit algorithm program is used. As shown in FIG. 7(*b*), when the AOD function is implemented by using the 2-bit algorithm program, the display area is a shadow area in FIG. 7(*b*), ranges from 300 to 780 in the X direction, and ranges from 300 to 1470 in the Y direction. When in the always on display state, the mobile phone may display a single clock interface and a multi-clock interface in the shadow area.

It may be learned from the figure that when the AOD function is implemented by using the 1-bit algorithm program, there is a large display area, but there is a relatively poor display effect due to limitation posed by the 1-bit algorithm program. When a single clock is displayed, there is a burr phenomenon on a font edge due to a relatively large font size. Consequently, there is a relatively poor content display effect, resulting in relatively poor user experience.

When the AOD function is implemented by using the 2-bit algorithm program, there is a small display area due to algorithm limitation. In comparison with the 1-bit algorithm, the display area is reduced by half in the X direction. There is a good display effect, but there is a small display area. In addition, when a plurality of clocks are displayed, a large amount of content is displayed, and display is always implemented in some areas because the font cannot move. Due to a feature of the OLED display, when a same static picture is displayed for a long time in a specific part, there is an irreversible organic material loss and a ghost image, and even there is a problem of screen burn-in.

FIG. 8 is a schematic flowchart of an always on display method according to an embodiment of this application. The method may be implemented in the mobile device (for example, a mobile phone or a tablet computer) that includes a touchscreen and a camera and that is shown in FIG. 1 and FIG. 2. As shown in FIG. 8, the method 800 includes the following steps.

810. The mobile device runs a first algorithm program in an always on display state, to display a first clock interface, where the first clock interface is displayed in a first display area of a display of the mobile device.

820. The mobile device receives a switching instruction, where the switching instruction is an instruction generated when the mobile device is switched from a first clock style to a second clock style.

830. The mobile device performs switching from the first algorithm program to a second algorithm program in response to the switching instruction.

840. The mobile device runs the second algorithm program in the always on display state, to display a second clock interface, where the second clock interface is displayed in a second display area of the display of the mobile device.

It should be understood that the first clock style corresponds to the first clock interface, the second clock style corresponds to the second clock interface, the second clock interface is different from the first clock interface, a size of the second display area is different from a size of the first display area, the second algorithm program is different from the first algorithm program, and the second display style is different from the first display style.

It should be further understood that when a user enables an AOD function of the mobile device, the mobile device may determine to enable the AOD function. For example, the user may turn on an "always on display" switch 60 by performing the operation described in FIG. 4(a), FIG. 4(b), FIG. 4(c), and FIG. 4(d), to enable the AOD function of the mobile device. In this application, the mobile device is in a status in which the AOD function is enabled.

It should be further understood that in this application, the mobile device may receive the switching instruction by performing a corresponding switching operation in a settings application by using the operation methods shown in FIG. 5(a), FIG. 5(b), FIG. 5(c), FIG. 5(d), FIG. 5(e), FIG. 6(a), FIG. 6(b), FIG. 6(c), FIG. 6(d), and FIG. 6(e). For details, refer to the related description in FIG. 5(a), FIG. 5(b), FIG. 5(c), FIG. 5(d), FIG. 5(e), FIG. 6(a), FIG. 6(b), FIG. 6(c), FIG. 6(d), and FIG. 6(e). In this way, a clock style of the mobile device is switched from a single clock style to a dual clock style or from a dual clock style to a single clock style.

Alternatively, the mobile device may receive the switching instruction in the always on display state. For example, in a screen-off scenario, the mobile device may detect a gesture (for example, a mid-air gesture or another shortcut gesture) performed by the user, and perform, by using the detected gesture performed by the user, an operation of switching a clock style. A method for switching the clock style by the user is not limited in this application. In a possible implementation, the first clock interface is a single clock interface, and the second clock interface is a multi-clock interface, in other words, the first clock style is a single clock style, and the second clock style is a multi-clock style. Alternatively, the first clock interface is a multi-clock interface, and the second clock interface is a single clock interface, in other words, the first clock style is a dual clock style, and the second clock style is a single clock style.

It should be understood that the first clock interface and the second clock interface in this application are used to distinguish between clock interfaces in two different always on display styles. For example, the first clock interface is a single clock interface, and the second clock interface is a dual clock interface. In this case, the user may perform the operations shown in FIG. 6(a) to FIG. 6(c), that is, switch the mobile phone from the single clock interface to the dual clock interface based on a switching operation performed by the user.

Figure 5E:
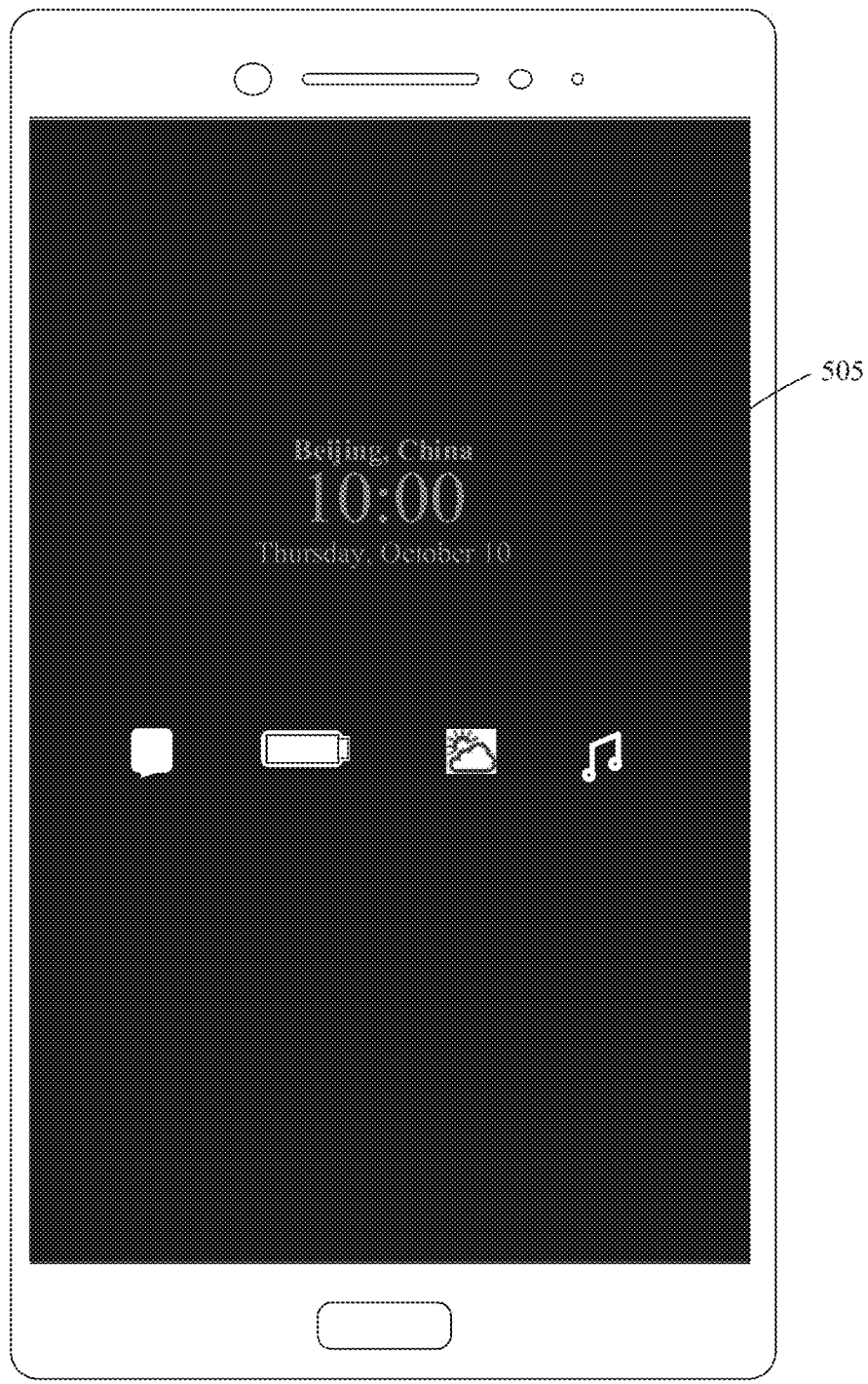

It should be further understood that when the first clock interface is a single clock interface, the first clock interface is displayed in the first display area of the display. For example, as shown in FIG. 5(e), the interface 505 includes only one clock window. The clock window may include a current location, time, a date, and the like, and the clock window may further include more other content such as weather and an application icon. This is not limited in this application.

Figure 6E:
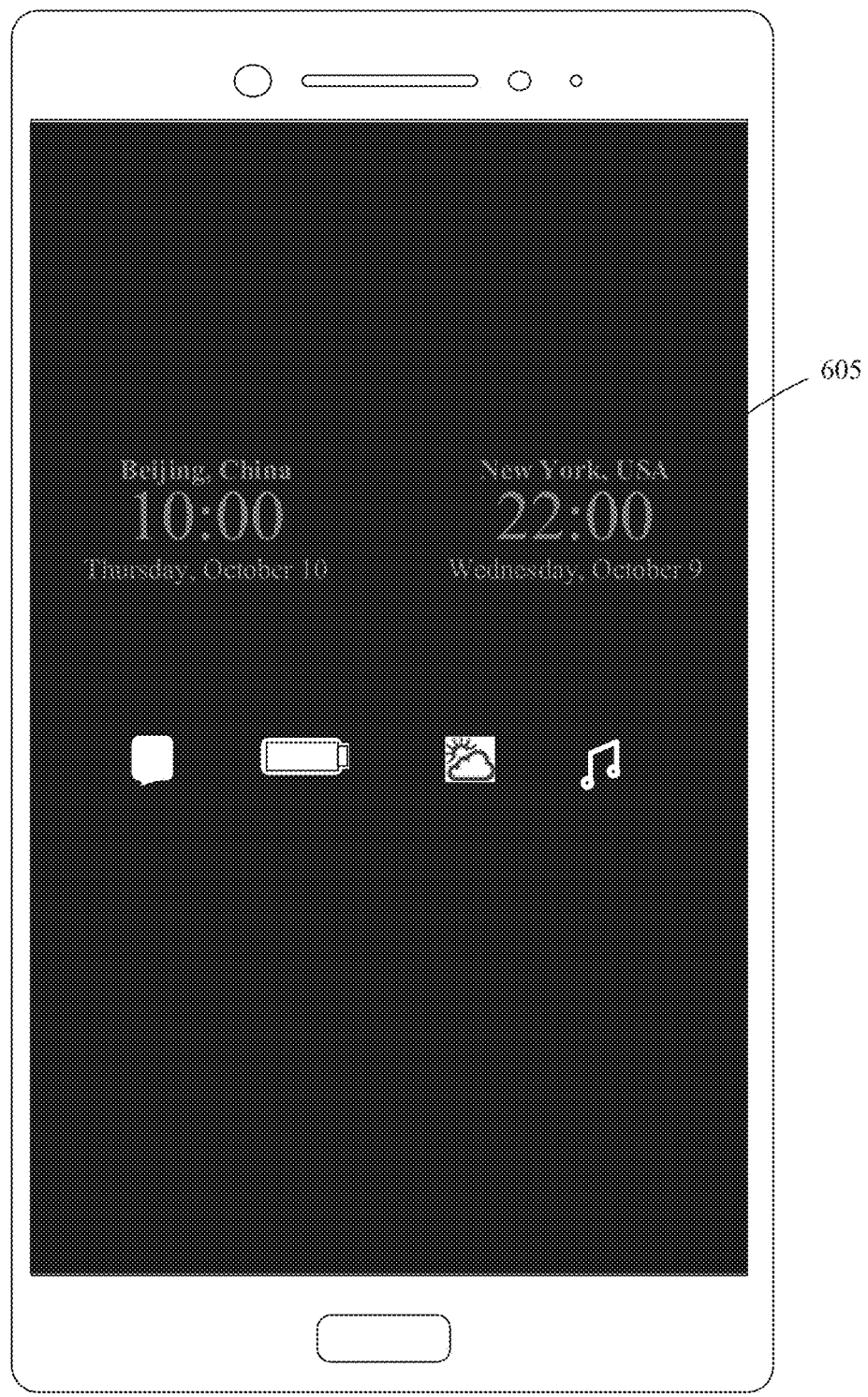

When the second clock interface is a dual clock interface, for example, time and a date in two clock windows, the second clock interface is displayed in the second display area of the display. For example, as shown in FIG. 6(e), the interface 402 may include two clock windows. Each of the two clock windows may include a different location, time and date corresponding to the location, and the like. In addition, each clock window may further include more other content such as weather and an application icon. This is not limited in this application.

It should be further understood that the switching instruction in this application may be sent by a processor of the mobile device to the display. Specifically, when the user performs switching from the single clock interface to the dual clock interface, the switching operation performed by the user may be the operation shown in FIG. 6(a) to FIG. 6(c). The processor of the mobile device generates the switching instruction based on the switching operation performed by the user, and sends the switching instruction to an IC module of the display. An occasion on which the processor sends the switching instruction to the IC module of the display is not limited in this application.

Optionally, the first algorithm program is a 2-bit algorithm program, and the second algorithm program is a 1-bit algorithm program.

Correspondingly, the switching instruction includes indication information of the 1-bit algorithm program. That is, the mobile device first displays a single clock window on the display by using the 2-bit algorithm program, and after the user switches the clock style from the single clock style to the dual clock style by performing a switching operation by using a mid-air gesture or a screen-off gesture in the always on display state, the processor of the mobile device sends the switching instruction to the IC module of the display. The switching instruction includes indication information of the 2-bit algorithm program, and is used to indicate the IC module of the display to run the 2-bit algorithm program to display the dual clock interface.

In a possible implementation, the single clock interface is used to display one clock window on the mobile device, the clock window can move in a corresponding display area of the display of the mobile device, and the corresponding display area of the display is smaller than an entire display area of the display.

Figure 7A:
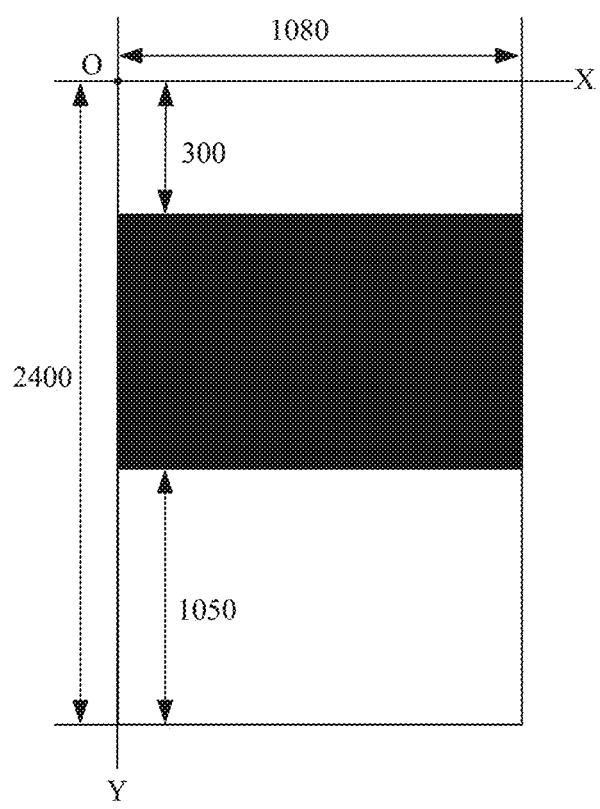
FIG. 7(a) and FIG. 7(b) are a schematic diagram of an AOD display area according to an embodiment of this application.
Figure 7B:
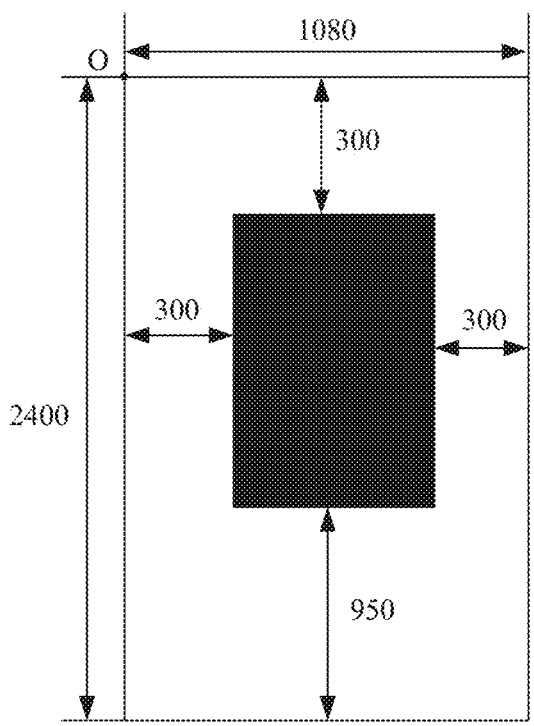

When AOD display is performed by using the 2-bit algorithm program, there may be a display area in a shadow part shown in FIG. 7(b). For example, the display area is referred to as the first display area. The first display area ranges from 300 to 780 in an X direction, and ranges from 300 to 1450 in a Y direction. The single clock interface of the mobile device may be displayed in the first display area, and when the mobile device includes a large enough screen, the single clock interface may move in the first display area.

It should be further understood that when moving in the corresponding display area, the single clock may automatically and periodically move up and down or move left and right based on a preset rule, or may move based on information such as a gravity sensor and a gyroscope of the mobile device, to adapt to a current status change of the mobile device. This is not limited in this application.

In the foregoing technical solution, when the mobile device displays a single clock, AOD display is performed by using the 2-bit algorithm program, and there is a relatively small display area in the case of a single clock. To adapt to the relatively small display area, information such as time, a location, and a date in a single clock window is presented in an effect of being displayed in a relatively small font size. In this way, there is no burr phenomenon on an edge, and the display effect is improved, and therefore visual experience of the user is improved. In addition, the clock window may move in the corresponding display area of the display. Therefore, there is no case in which a same static picture is always displayed in a specific part, and a problem of screen burn-in is avoided, thereby prolonging a service life of a screen.

In a possible implementation, the multi-clock interface is used to display at least two clock windows on the mobile device, the at least two clock interfaces can move in a corresponding display area of the display, and the corresponding display area of the display is smaller than the entire display area of the display.

When AOD display is performed by using a display policy corresponding to the 1-bit algorithm program, there may be a display area in a shadow part shown in FIG. 7(a).

For example, the display area is referred to as the second display area, and a range of the second display area is greater than that of the first display area. For example, the second display area ranges from 0 to 1080 in the X direction, and ranges from 300 to 1350 in the Y direction. Both of the two clocks of the mobile device may be displayed in the second display area, and the two clocks may move in the second display area.

It should be further understood that when moving in the corresponding display area of the display, the plurality of clock windows may automatically and periodically move up and down or move left and right based on a preset rule, or may move based on information such as the gravity sensor and the gyroscope of the mobile device, to adapt to a current status change of the mobile device. In addition, the plurality of clock windows may synchronously or asynchronously move in the second display area. This is not limited in this application In the foregoing technical solution, when the mobile device displays the multi-clock interface, AOD display is performed by using the 1-bit algorithm program, so that a display area is larger than a display area determined by using the 2-bit algorithm program. In this way, the display area is expanded, and therefore adaptation to display of the multi-clock interface can be implemented, to ensure that information such as time, a location, and a date in all clocks can be presented in the display area. In addition, during multi-clock display, information such as time, a location, and a date in the clock window is displayed in a relatively small font size. Therefore, there is no sensitive burr on a font edge, and a good effect is presented without affecting a visual effect of the user. In addition, the clock window may move in the relatively large display area. Therefore, there is no case in which a same static picture is always displayed in a specific part, and a problem of screen burn-in is avoided, thereby prolonging a service life of a screen.

Alternatively, in another possible implementation, the first clock interface is a dual clock interface, and the second clock interface is a single clock interface, in other words, the first clock style is a dual clock style, and the second clock style is a single clock style. This process is of performing switching from the dual clock style to the single clock style by the user.

For example, the first clock interface may be a dual clock interface, and the second clock interface may be a single clock interface. In this case, the user may disable dual clock display by tapping a dual clock switch in FIG. 6(c), that is, switch the mobile phone from the dual clock interface to the single clock interface based on the switching operation performed by the user.

It should be understood that the first clock interface and the second clock interface in this application are used to distinguish between different clock interfaces in two different clock styles. In this implementation, the first clock interface is a dual clock interface, and the second clock interface is a single clock interface. In this case, the user may tap the dual clock switch, so that the dual clock switch is in an off (OFF) state, as shown in FIG. 5(c), that is, the mobile phone is switched from the dual clock style to the single clock style based on the switching operation performed by the user.

In this case, the first clock interface includes content for dual clock display, for example, time and a date in two clock windows, and the second clock interface is a single clock interface, and may include content for single clock display, for example, time and a date in one clock window.

It should be understood that in this implementation, the switching instruction may be sent by a processor of the mobile device to the display. Specifically, the user performs switching from the dual clock interface to the single clock interface, and the processor of the mobile device generates the switching instruction based on the switching operation performed by the user, and sends the switching instruction to an IC module of the display.

Optionally, the first algorithm program is a 1-bit algorithm program, and the second algorithm program is a 2-bit algorithm program.

Figure 9:
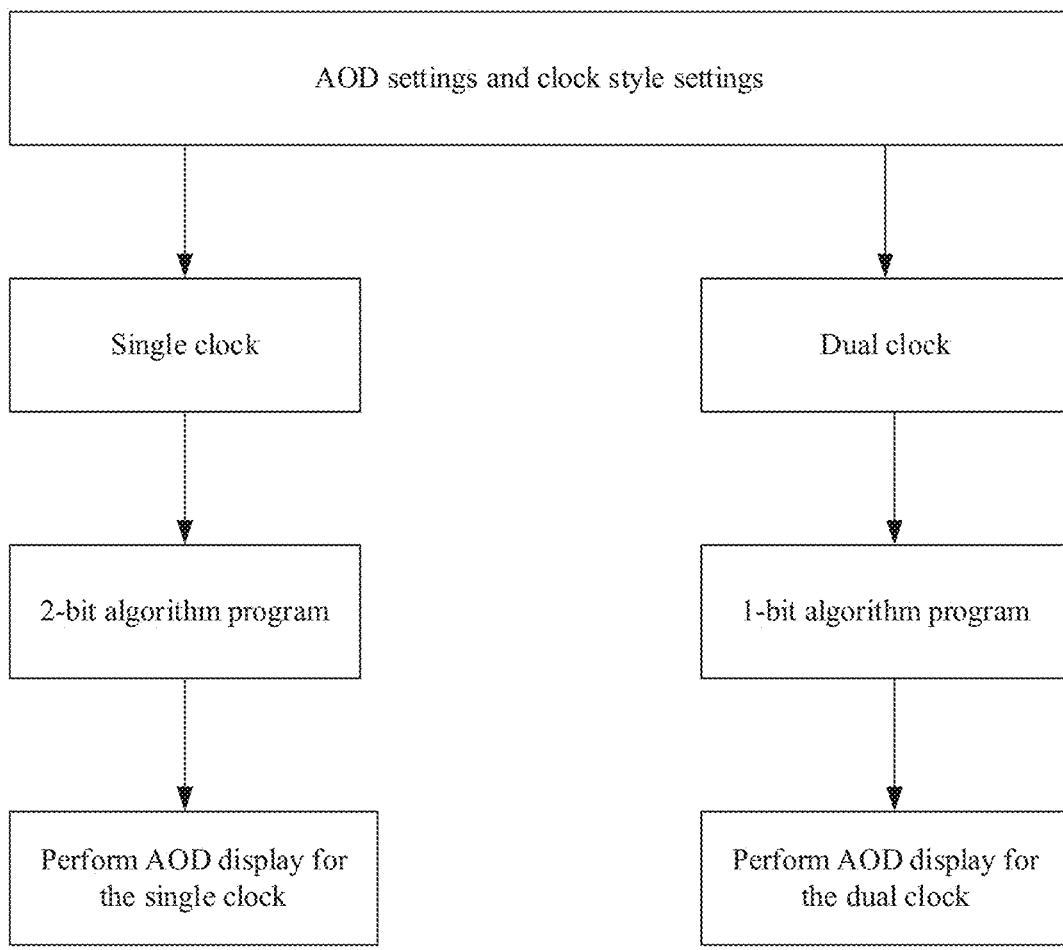
FIG. 9 is a schematic diagram of an always on display method for a mobile device according to an embodiment of this application.

Correspondingly, the switching instruction includes indication information of the 2-bit algorithm program. That is, the mobile device first displays the dual clock interface on the display by using the 1-bit algorithm program, and after the user switches the clock style from the dual clock style to the single clock style by performing the switching operation, the processor of the mobile device sends the switching instruction to the IC module of the display. The switching instruction includes indication information of the 1-bit algorithm program, and is used to indicate the IC module of the display to run the 1-bit algorithm program to display the single clock interface. FIG. 9 is a schematic diagram of an always on display method for a mobile device according to an embodiment of this application. As shown in FIG. 9, in the always on display method in this application, adaption to a single clock interface and a multi-clock interface of an AOD function of the mobile device is implemented, and different algorithms are adaptively used for display, to ensure an optimal display effect.

Specifically, as shown in FIG. 9, a user may enable the always on display function of the mobile device and set a clock style (for example, a single clock style or a dual clock style) by using AOD settings and clock style settings of the mobile device. When the user sets the clock style to the single clock style, a processor of the mobile device sends an instruction to an IC module of a display. The instruction includes indication information of a 2-bit algorithm program. After receiving the indication information of the 2-bit algorithm program, the IC module invokes and runs the stored 2-bit algorithm program, and displays the single clock interface based on the 2-bit algorithm program.

In the method, for the single clock style set by the user, a display area and a display effect are determined by using the 2-bit algorithm program, so that there is a relatively small display area. To adapt to the relatively small display area, information such as time, a location, and a date in a single clock window is presented in an effect of being displayed in a relatively small font size. In this way, there is no burr phenomenon on an edge, and the display effect is improved.

Alternatively, when the user sets the clock style to the dual clock style, a processor of the mobile device sends an instruction to an IC module of a display. The instruction includes indication information of a 1-bit algorithm program. After receiving the indication information of the 1-bit algorithm program, the IC module invokes and runs the stored 1-bit algorithm program, and displays a dual clock interface based on the 1-bit algorithm program.

In the method, for a multi-clock style (for example, the dual clock style) set by the user, a display area and a display effect are determined by using the 1-bit algorithm program. In this way, the display area is expanded, and therefore adaptation to display of a plurality of clock windows can be implemented, to ensure that information such as time, a location, and a date in all the clock windows can be presented in the display area. In addition, the clock window may move in the relatively large display area. Therefore, there is no case in which a same static picture is always displayed in a specific part, and a problem of screen burn-in is avoided, thereby prolonging a service life of a screen.

Figure 10:
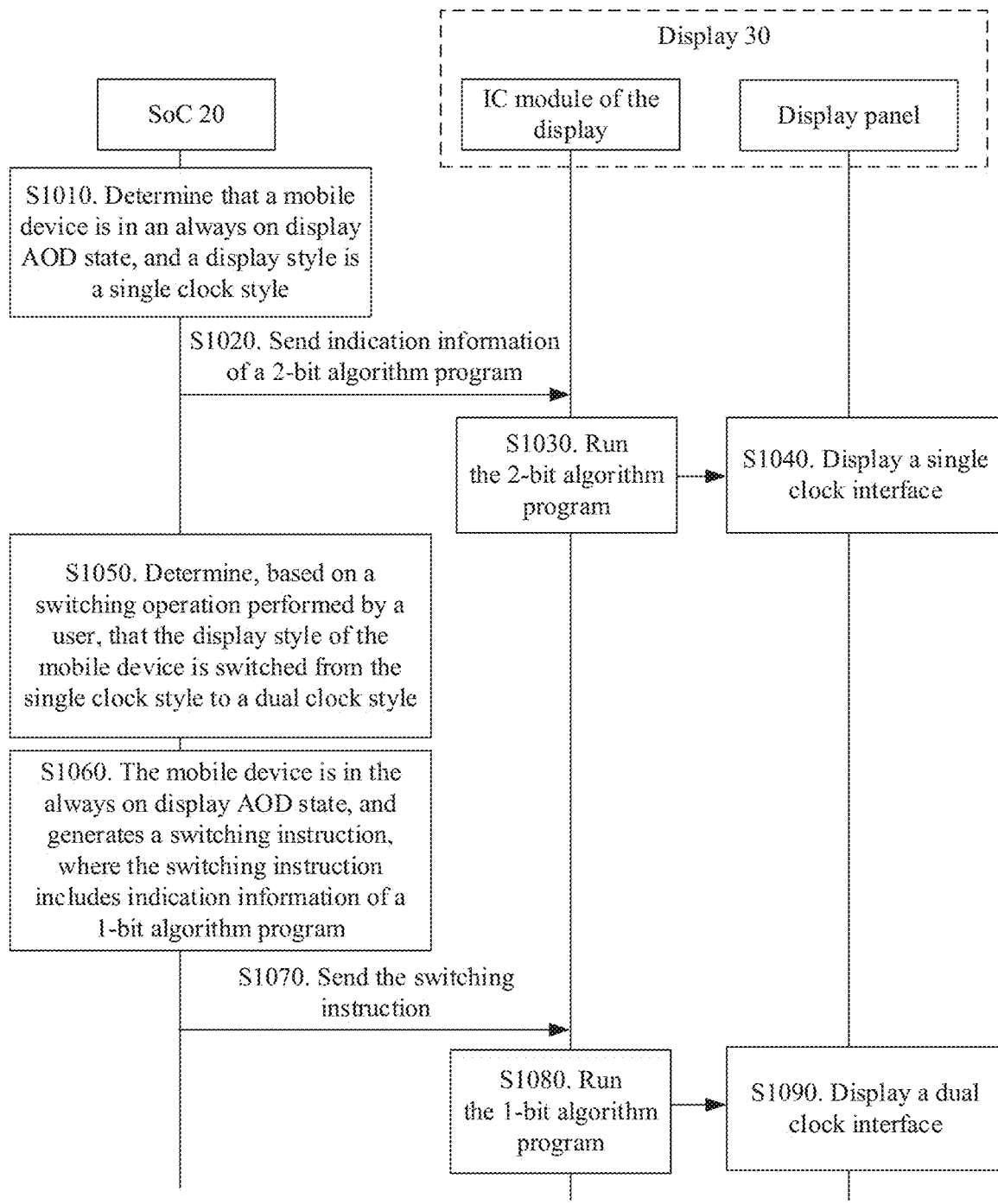
FIG. 10 is a schematic diagram of a process of implementing an always on display method for a mobile device according to an embodiment of this application.

FIG. 10 is a schematic diagram of a process of implementing an always on display method for a mobile device according to an embodiment of this application. As shown in FIG. 10, the method is performed by an SoC 20 and a display 30 of the mobile device, and the method includes the following steps.

S1010. The SoC 20 determines that the mobile device is in an always on display AOD state, and a display style of the mobile device is a single clock style. It should be understood that in the operation shown in FIG. 4(a), FIG. 4(b), FIG. 4(c), and FIG. 4(d), when a user turns on an always on display switch 60 in a settings application, the SoC 20 may determine that an always on display function is enabled for the mobile device. Similarly, in the operation shown in FIG. 5(a), FIG. 5(b), FIG. 5(c), FIG. 5(d), and FIG. 5(e), when the user turns off a dual clock switch in a settings application, or when it is considered by default for the mobile device that a dual clock switch is in an off (OFF) state, the SoC 20 may determine that the display style of the mobile device is the single clock style.

S1020. The SoC 20 sends an instruction to an IC module of the display 30, where the instruction includes indication information of a 2-bit algorithm program.

S1030. After receiving the instruction sent by the SoC 20, the IC module of the display 30 invokes and runs the stored 2-bit algorithm program.

S1040. The IC module of the display 30 displays a single clock interface based on the 2-bit algorithm program.

S1050. Determine, based on a switching operation performed by the user, that the display style of the mobile device is switched from the single clock style to a dual clock style. In the operation shown in FIG. 5(a), FIG. 5(b), FIG. 5(c), FIG. 5(d), and FIG. 5(e), when the user turns on the dual clock switch in the settings application, the SoC 20 may determine that the display style of the mobile device is the dual clock style.

S1060. The mobile device is in the always on display AOD state, and generates a switching instruction, where the switching instruction includes indication information of a 1-bit algorithm program.

S1070. The SoC 20 sends the switching instruction to the IC module of the display 30, where the switching instruction includes the indication information of the 1-bit algorithm program.

S1080. After receiving the switching instruction sent by the SoC 20, the IC module of the display 30 invokes and runs the stored 1-bit algorithm program.

S1090. The IC module of the display 30 displays a dual clock interface based on the 1-bit algorithm program.

An implementation process of performing switching from the single clock interface to the dual clock interface by the mobile device is described above. Similarly, the mobile device may perform switching from the dual clock interface to the single clock interface, in other words, perform switching from a display policy corresponding to the 1-bit algorithm program to a display policy corresponding to the 2-bit algorithm program. Details are not described herein.

In the method, adaptation to the single clock interface and the dual clock interface of the AOD function of the mobile device is implemented, and different algorithms are adaptively used for display, to ensure an optimal display effect. In the method, for the single clock display style set by the user, a display area and a display policy are determined by using the 2-bit algorithm, so that there is a relatively small display area. To adapt to the relatively small display area, information such as time, a location, and a date in a single clock window is presented in an effect of being displayed in a relatively small font size. In this way, there is no burr phenomenon on an edge, and the display effect is improved. For a multi-clock display style (for example, the dual clock style) set by the user, a display area and a display policy are determined by using the 1-bit algorithm. In this way, the display area is expanded, and therefore adaptation to display of a plurality of clock windows can be implemented, to ensure that information such as time, a location, and a date in all the clock windows can be presented in the display area. In addition, the clock window may move in the relatively large display area. Therefore, there is no case in which a same static picture is always displayed in a specific part, and a problem of screen burn-in is avoided, thereby prolonging a service life of a screen.

It may be understood that to implement the foregoing functions, the mobile device includes corresponding hardware and/or software modules for performing the functions. With reference to algorithm steps of each example described in embodiments disclosed in this specification, this application may be implemented in a form of hardware or a combination of hardware and computer software. Whether a function is performed by hardware or hardware driven by computer software depends on a particular application and a design constraint of the technical solutions. A person skilled in the art may use different methods to implement the described functions for each particular application with reference to embodiments, but it should not be considered that the implementation goes beyond the scope of this application.

In embodiments, the mobile device may be divided into function modules based on the foregoing method examples. For example, each function module corresponding to each function may be obtained through division, or two or more functions may be integrated into one processing module. The integrated module may be implemented in a form of hardware. It should be noted that the module division in embodiments is an example, and is merely logical function division. In an actual implementation, another division manner may be used.

Figure 11:
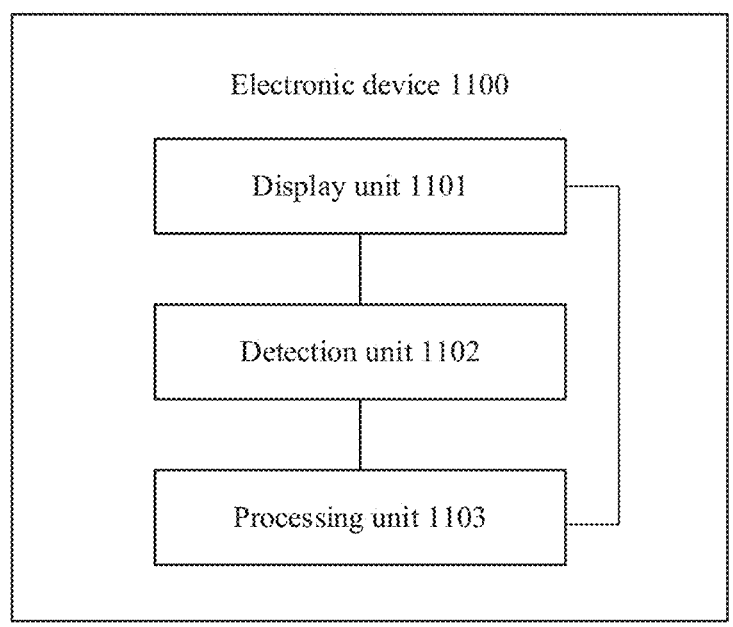
FIG. 11 is a schematic diagram of possible composition of a mobile device according to an embodiment of this application.

When each functional module is obtained through division based on each corresponding function, FIG. 11 is a schematic diagram of possible composition of a mobile device 1100 in the foregoing embodiment. As shown in FIG. 11, the mobile device 1100 may include a display unit 1101, a detection unit 1102, and a processing unit 1103.

The display unit 1101 may be configured to support the mobile device 1100 in performing AOD display in the foregoing step and/or another process used for a technology described in this specification.

The detection unit 1102 may be configured to support the mobile device 1100 in performing step 610 and the like, and/or another process used for the technology described in this specification.

The processing unit 1103 may be configured to support the mobile device 1100 in performing step 620, step 630, and the like, and/or another process used for the technology described in this specification.

It should be noted that all related content of the steps in the foregoing method embodiments may be cited in function description of corresponding function modules. Details are not described herein again.

The mobile device provided in this embodiment is configured to perform the foregoing always on display method.

Therefore, effects that are the same as those of the foregoing implementation method can be achieved.

When an integrated unit is used, the mobile device may include a processing module, a storage module, and a communications module. The processing module may be configured to control and manage an action of the mobile device, for example, may be configured to support the mobile device in performing the steps performed by the display unit 1101, the detection unit 1102, and the processing unit 1103. The storage module may be configured to support the mobile device in executing stored program code, data, and the like. The communications module may be configured to support the mobile device in performing communication with another device.

The processing module may be a processor or a controller. The processing module may implement or execute various example logical blocks, modules, and circuits described with reference to content disclosed in this application. Alternatively, the processor may be a combination of processors implementing a computing function, for example, a combination of one or more microprocessors, or a combination of a digital signal processor (digital signal processor, DSP) and a microprocessor. The storage module may be a memory. The communications module may be specifically a device, for example, a radio frequency circuit, a Bluetooth chip, or a Wi-Fi chip, that interacts with another mobile device.

In an embodiment, when the processing module is a processor and the storage module is a memory, the mobile device in this embodiment may be a device in the structures shown in FIG. 1 and FIG. 2.

Embodiments further provide a computer storage medium. The computer storage medium stores computer instructions, and when the computer instructions are run on a mobile device, the mobile device is enabled to perform the related method steps, to implement the always on display method in the foregoing embodiments.

Embodiments further provide a computer program product. When the computer program product is run on a computer, the computer is enabled to perform the foregoing related steps, to implement the always on display method in the foregoing embodiments.

In addition, embodiments of this application further provide an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, to enable the chip to perform the always on display method in the foregoing method embodiments.

The mobile device, the computer storage medium, the computer program product, or the chip provided in embodiments is configured to perform a corresponding method provided above. Therefore, for beneficial effects that can be achieved by the mobile device, the computer storage medium, the computer program product, or the chip, refer to beneficial effects of the corresponding method provided above. Details are not described herein again.

Based on the foregoing descriptions of the implementations, a person skilled in the art may understand that for the purpose of convenient and brief descriptions, division into the foregoing function modules is merely used as an example for description. In actual application, the foregoing functions can be allocated to different function modules for implementation based on a requirement, that is, an inner structure of an apparatus is divided into different function modules to implement all or some of the functions described above.

In the several embodiments provided in this application, it should be understood that the disclosed apparatuses and methods may be implemented in other manners. For example, the described apparatus embodiment is merely an example. For example, division into the modules or units is merely logical function division and may be other division in actual implementation. For example, a plurality of units or components may be combined or integrated into another apparatus, or some features may be ignored or not performed. In addition, the displayed or discussed mutual coupling or direct coupling or communication connections may be implemented through some interfaces. The indirect coupling or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, function units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application. The foregoing storage medium includes any medium that can store program code, such as a USB flash drive, a removable hard disk, a read only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method applied to a mobile device, wherein the method comprises:
running, in an always-on display state of the mobile device, a first algorithm program to display a first clock interface in a first display area of a display of the mobile device;
receiving a switching instruction when the mobile device is switched from a first clock style to a second clock style, wherein the first clock style corresponds to the first clock interface, wherein the second clock style corresponds to a second clock interface, wherein the second clock interface is different from the first clock interface, and wherein the second clock style is different from the first clock style;
performing switching from the first algorithm program to a second algorithm program in response to the switching instruction; and
running, in the always-on display state, the second algorithm program to display the second clock interface in a second display area of the display,
wherein a size of the second display area is different from a size of the first display area, and
wherein the second algorithm program is different from the first algorithm program.

2. The method of claim 1, wherein the first clock style is a single clock style and the second clock style is a multi-clock style, or wherein the first clock style is a multi-clock style and the second clock style is a single clock style.

3. The method of claim 2, wherein the single clock style displays a clock window on the mobile device, wherein the clock window moves in a corresponding display area of the display, wherein the multi-clock style displays at least two clock windows on the mobile device, wherein the at least two clock windows move in the corresponding display area of the display, and wherein the corresponding display area is smaller than an entire display area of the display.

4. The method of claim 1, wherein when the first clock style is a single clock style and the second clock style is a multi-clock style, the first algorithm program is a 2-bit algorithm program and the second algorithm program is a 1-bit algorithm program, and wherein when the first clock style is a multi-clock style and the second clock style is a single clock style, the first algorithm program is a 1-bit algorithm program and the second algorithm program is a 2-bit algorithm program.

5. The method of claim 2, wherein when the first clock style is a single clock style and the second clock style is a multi-clock style, the first algorithm program is a 2-bit algorithm program and the second algorithm program is a 1-bit algorithm program, and wherein when the first clock style is a multi-clock style and the second clock style is a single clock style, the first algorithm program is a 1-bit algorithm program and the second algorithm program is a 2-bit algorithm program.

6. The method of claim 1, wherein the display is an organic light-emitting diode (OLED) display in a video mode, and wherein the OLED display comprises no random-access memory (RAM).

7. The method of claim 1, further comprising:
detecting a first operation for unlocking the mobile device;
displaying, in response to the first operation, an interface;
detecting a second operation on a settings icon in the interface;
displaying, in response to the second operation, a settings interface;
detecting, on the settings interface, a third operation of performing switching from the first clock style to the second clock style; and
generating the switching instruction in response to the third operation.

8. The method according to claim 2, further comprising:
detecting a first operation for unlocking the mobile device;
displaying, in response to the first operation, an interface;
detecting a second operation on a settings icon in the interface;
displaying, in response to the second operation, a settings interface;
detecting, on the settings interface, a third operation of performing switching from the first clock style to the second clock style; and
generating the switching instruction in response to the third operation.

9. The method of claim 1, further comprising obtaining the switching instruction in the always-on display state.

10. The method of claim 2, further comprising obtaining the switching instruction in the always-on display state.

11. A mobile device comprising:
an organic light-emitting diode (OLED) display; and
a processor coupled to the OLED display and configured to:
run, in an always-on display state of the mobile device, a first algorithm program to display a first clock interface in a first display area of a display of the mobile device;
receive a switching instruction when the mobile device is switched from a first clock style to a second clock style, wherein the first clock style corresponds to the first clock interface, wherein the second clock style corresponds to a second clock interface, wherein the second clock interface is different from the first clock interface, and wherein the second clock style is different from the first clock style;
perform switching from the first algorithm program to a second algorithm program in response to the switching instruction; and
run, in the always-on display state, the second algorithm program to display the second clock interface in a second display area of the display,
wherein a size of the second display area is different from a size of the first display area, and
wherein the second algorithm program is different from the first algorithm program.

12. The mobile device of claim 11, wherein the first clock style is a single clock style, and the second clock style is a multi-clock style, or wherein the first clock style is a multi-clock style, and the second clock style is a single clock style.

13. The mobile device of claim 12, wherein the single clock style displays a clock window on the mobile device, wherein the clock window moves in a corresponding display area of the display, wherein the multi-clock style displays at least two clock windows on the mobile device, wherein the at least two clock windows move in the corresponding display area, and wherein the corresponding display area is smaller than an entire display area of the display.

14. The mobile device of claim 11, wherein when the first clock style is a single clock style and the second clock style is a multi-clock style, the first algorithm program is a 2-bit algorithm program and the second algorithm program is a 1-bit algorithm program, and wherein when the first clock style is a multi-clock style and the second clock style is a single clock style, the first algorithm program is a 1-bit algorithm program and the second algorithm program is a 2-bit algorithm program.

15. The mobile device of claim 12, wherein when the first clock style is a single clock style and the second clock style is a multi-clock style, the first algorithm program is a 2-bit algorithm program and the second algorithm program is a 1-bit algorithm program, and wherein when the first clock style is a multi-clock style and the second clock style is a single clock style, the first algorithm program is a 1-bit algorithm program and the second algorithm program is a 2-bit algorithm program.

16. The mobile device of claim 11, wherein the OLED display is in a video mode and comprising no random-access memory (RAM).

17. The mobile device of claim 11, wherein the processor is further configured to:
   detect a first operation for unlocking the mobile device;
   display, in response to the first operation, an interface;
   detect a second operation on a settings icon in the interface;
   display, in response to the second operation, a settings interface;
   detect, on the settings interface, a third operation of performing switching from the first clock style to the second clock style; and
   generate the switching instruction in response to the third operation.

18. The mobile device of claim 12, wherein the processor is further configured to:
   detect a first operation for unlocking the mobile device;
   display, in response to the first operation, an interface;
   detect a second operation on a settings icon in the interface;
   display, in response to the second operation, a settings interface;
   detect, on the settings interface, a third operation of performing switching from the first clock style to the second clock style; and
   generate the switching instruction in response to the third operation.

19. The mobile device of claim 11, wherein the processor is further configured to obtain the switching instruction in the always-on display state.

20. The mobile device of claim 12, wherein the processor is further configured to obtain the switching instruction in the always-on display state.

* * * * *